(12) United States Patent
Koito et al.

(10) Patent No.: US 9,772,501 B2
(45) Date of Patent: Sep. 26, 2017

(54) DISPLAY DEVICE

(71) Applicant: Japan Display Inc., Tokyo (JP)

(72) Inventors: Takeo Koito, Tokyo (JP); Yingbao Yang, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/445,538

(22) Filed: Feb. 28, 2017

(65) Prior Publication Data

US 2017/0168310 A1 Jun. 15, 2017

Related U.S. Application Data

(63) Continuation of application No. 14/226,191, filed on Mar. 26, 2014, now Pat. No. 9,612,443.

(30) Foreign Application Priority Data

Mar. 29, 2013 (JP) .................. 2013-072768

(51) Int. Cl.
*G02F 1/1333* (2006.01)
*G02B 27/22* (2006.01)
*H04N 13/04* (2006.01)

(52) U.S. Cl.
CPC ..... *G02B 27/2214* (2013.01); *H04N 13/0409* (2013.01); *H04N 13/0468* (2013.01)

(58) Field of Classification Search
CPC ............. G02F 1/133345; G02F 1/1333; G02B 27/2214; H04N 13/0409; H04N 13/0468

(Continued)

(56) References Cited

U.S. PATENT DOCUMENTS

2008/0030634 A1* 2/2008 Aramatsu .......... G02B 27/2214
349/15
2012/0268671 A1* 10/2012 Inoue ................. G02B 27/2214
349/15

(Continued)

FOREIGN PATENT DOCUMENTS

JP 11-258613 9/1999
JP 2012-042821 3/2012

(Continued)

OTHER PUBLICATIONS

Japanese Patent Office Action for application No. 2013-072768 dated Aug. 11, 2015.

*Primary Examiner* — Nathanael R Briggs
*Assistant Examiner* — William Peterson
(74) *Attorney, Agent, or Firm* — Michael Best & Friedrich LLP

(57) ABSTRACT

According to an aspect, a display device includes a display part having pixels and a color filter; and a barrier part in which unit areas arranged above the display part, arranged in rows in a first direction, and extending in a second direction intersecting with the first direction. The barrier part includes a barrier substrate that has barrier electrodes arranged for each unit area and extending in the second direction, a counter substrate, a liquid crystal layer, and spacers arranged between the barrier substrate and the counter substrate. Each of the spacers is arranged between one barrier electrode out of the barrier electrodes and the other barrier electrode adjacent to the one barrier electrode, and overlaps with a filter of a color different from a color of a filter of the color filter that overlaps with a spacer adjacent to the spacer in the second direction.

5 Claims, 19 Drawing Sheets

(58) Field of Classification Search
USPC .......................................................... 349/122
See application file for complete search history.

(56) References Cited

U.S. PATENT DOCUMENTS

2013/0128212 A1   5/2013   Yabiku
2013/0250195 A1   9/2013   Koito et al.

FOREIGN PATENT DOCUMENTS

| JP | 2012-194257 | 10/2012 |
| JP | 2012-234142 | 11/2012 |
| JP | 2013-187758 | 9/2013 |
| WO | WO-2011/129191 | 10/2011 |

\* cited by examiner

DISPLAY UNIT 522
SHUTTER BUTTON 524
523 MENU SWITCH

LENS 532
BODY 531
534 DISPLAY UNIT
533 START/STOP SWITCH

LOWER HOUSING
552

553
CONNECTION UNIT

551
UPPER HOUSING

UPPER HOUSING
551

552
LOWER HOUSING

562

561

DISPLAY DEVICE

CROSS-REFERENCE TO RELATED APPLICATIONS

This application is a Continuation of U.S. application Ser. No. 14/226,191, filed on Mar. 26, 2014, which claims priority from Japanese Application No. 2013-072768, filed on Mar. 29, 2013, the contents of which are incorporated by reference herein in their entirety.

BACKGROUND

1. Technical Field

The present disclosure relates to a display device.

2. Description of the Related Art

In recent years, as a display device that displays images, there has been a display device that displays images each of which is viewable in a stereoscopic manner (a three dimensional manner) by a user (viewer); that is, what is called a three-dimensional image display device. In the three-dimensional image display device, for example, a barrier part is arranged at a display surface side of a display part that displays images. In the barrier part, a part of an image displayed on the display part is adjusted for being incident on a right eye of a user and the other part of the image is adjusted for being incident on a left eye of the user.

The display device controls images displayed on the display part and controls the barrier part to reach different images to the right and left eyes of a user and hence, the images are viewed in a stereoscopic manner by the user. There also exists a dual screen display device that displays different images separated by the barrier part toward right and left directions in the same manner as the case of the three-dimensional image display device.

A liquid crystal panel can be used as the display part and/or the barrier part. The liquid crystal panel includes a pixel substrate which is provided with pixel electrodes or the like. The liquid crystal panel includes a liquid crystal layer provided between the pixel substrate and a counter substrate arranged corresponding to the pixel substrate. The liquid crystal panel maintains the liquid crystal layer in a certain amount of thickness by arranging a spacer having a thickness corresponding to the thickness of the liquid crystal layer between the pixel substrate and the counter substrate in some cases. For example, Japanese Patent Application Laid-open Publication No. 2012-194257 (JP-A-2012-194257) discloses a display device including a plurality of spacers arranged at random in at least a part of an area on a substrate surface.

As described in JP-A-2012-194257, the spacers are arranged at random thus preventing the occurrence of moire in a display image. However, when the spacers are arranged at random, there exists the case that the spacers adversely affect electrodes or wiring depending on positions at which the spacers are arranged and cause defects in the display device. In the liquid crystal panel used for the barrier part, each pixel used as one drive unit has a linear shape is arranged extending over the entire area in one direction of the screen and hence, a defect partially caused extends in a linear shape. On the other hand, when the spacers are arranged at positions such that the spacers do not adversely affect electrodes or wiring, the occurrence of defects can be prevented. However, there exists the case that moire occurs due to the spacers.

For the foregoing reasons, there is a need for a display device that can prevent the occurrence of moire while preventing the occurrence of defects in pixels.

SUMMARY

According to an aspect of the present disclosure, a display device includes: a display part in which a plurality of pixels including a plurality of sub pixels are arranged in a two-dimensional array and a color filter is stacked such that each of a plurality of filters colored in different colors is arranged at a position corresponding to the respective sub pixels; and a barrier part in which a plurality of unit areas arranged above the display part, arranged in rows in a first direction, and each extending in a second direction intersecting with the first direction, the barrier part being a liquid crystal panel that changes over transmission and interruption of light incident on the unit areas. The barrier part includes a barrier substrate that has a plurality of barrier electrodes arranged for each unit area and extending in the second direction, a counter substrate arranged to face the barrier substrate, a liquid crystal layer composed of liquid crystal injected into a space between the barrier substrate and the counter substrate, and a plurality of spacers arranged between the barrier substrate and the counter substrate. Each of the spacers is arranged between one barrier electrode out of the barrier electrodes and the other barrier electrode adjacent to the one barrier electrode, and overlaps with a filter of a color different from a color of a filter of the color filter that overlaps with a spacer adjacent to the spacer in the second direction.

According to another aspect of the present disclosure, a display device includes: a display part in which a plurality of pixels including a plurality of sub pixels are arranged in a two-dimensional array and a color filter is stacked such that each of a plurality of filters colored in different colors is arranged at a position corresponding to the respective sub pixels; and a barrier part in which a plurality of unit areas arranged above the display part, arranged in rows in a first direction, and each extending in a second direction intersecting with the first direction, the barrier part being a liquid crystal panel that changes over transmission and interruption of light incident on the unit areas. The barrier part includes a barrier substrate that has a plurality of barrier electrodes arranged for each unit area and extending in the second direction, a counter substrate arranged to face the barrier substrate, a liquid crystal layer composed of liquid crystal injected into a space between the barrier substrate and the counter substrate, and a plurality of spacers arranged between the barrier substrate and the counter substrate. A spacer arranged at least at a position overlapped with any of the barrier electrodes out of the spacers is formed in such a shape that a sectional area along a section parallel to the display surface is gradually increased toward the barrier substrate from the counter substrate.

DETAILED DESCRIPTION

Modes for carrying out a display device (embodiment of the display device) in the present disclosure are specifically explained in reference to the drawings. The present disclosure is not limited to contents described in the following embodiment. The constitutional elements described below include additional effects or modifications that can be effected by those skilled in the art and/or parts substantially identical with each other. In addition, the constitutional elements described below can be constituted arbitrarily by combining with each other. The explanations are made in the following order; that is, 1. Embodiment (display device),
2. Applicable examples (electronic apparatuses):
   Examples for applying a display device according to the embodiment to electronic apparatuses.
3. Aspects of the present disclosure

1. EMBODIMENT (DISPLAY DEVICE)

A display device according to an embodiment explained below can be, for example, applied to a display device that displays three dimensional images thereon by controlling a barrier part arranged above a display part. Examples of the display part of the display device include, but are not limited to, a liquid crystal display (LCD), a micro electro mechanical system (MEMS), an organic electro-luminescence (EL) display device, and a plasma display device.

The display device in the embodiment can be applied to both of a monochrome display device and a color display device. When the display device is applied to the color display device, one pixel (unit pixel) that constitutes a unit for forming a color image is constituted of a plurality of sub pixels. To be more specific, in the color display device, one pixel is constituted of three sub pixels: a sub pixel that displays a red color (referred to as "R"), a sub pixel that displays a green color (referred to as "G"), and a sub pixel that displays a blue color (referred to as "B"), for example.

The constitution of one pixel is not limited to a constitution of sub pixels of three primary colors R, G, and B, and one pixel can also be constituted by adding a sub pixel of one color or sub pixels of a plurality of colors to the sub pixels of the three primary colors R, G, and B. To be more specific, for example, one pixel can also be constituted by adding a sub pixel that displays a white color (referred to as "W") for improving brightness, or constituted by adding at least one sub pixel that displays a complementary color for expanding a color reproduction range.

Constitution

Figure 1:
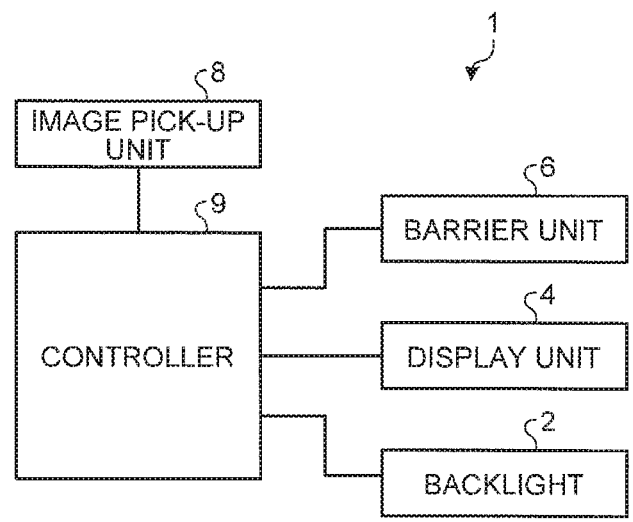
FIG. 1 is a block diagram illustrating one example of a functional configuration of a display device according to an embodiment.
Figure 2:
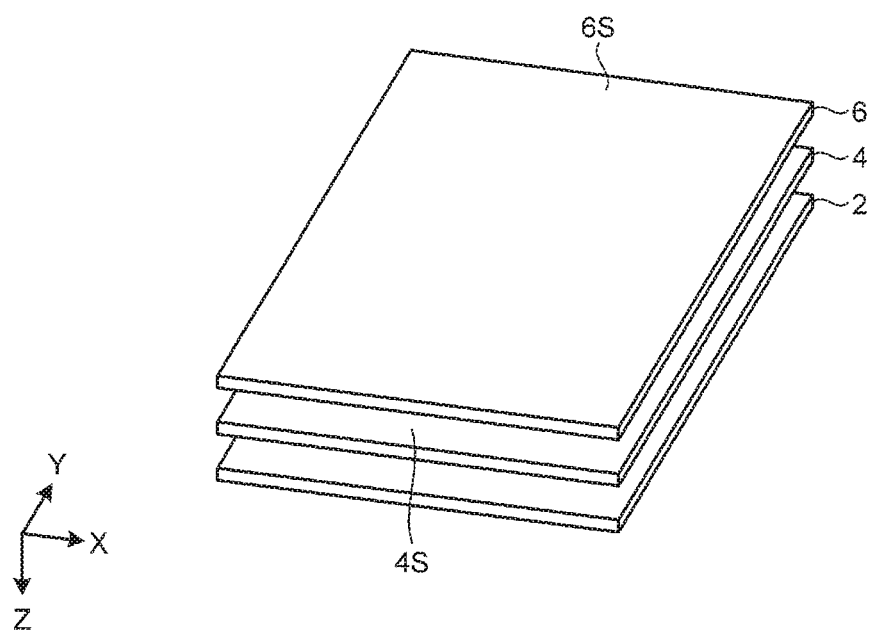
FIG. 2 is a perspective view illustrating one example of a constitution of a back light, a display part, and a barrier part in the display device illustrated in FIG. 1.
Figure 3:
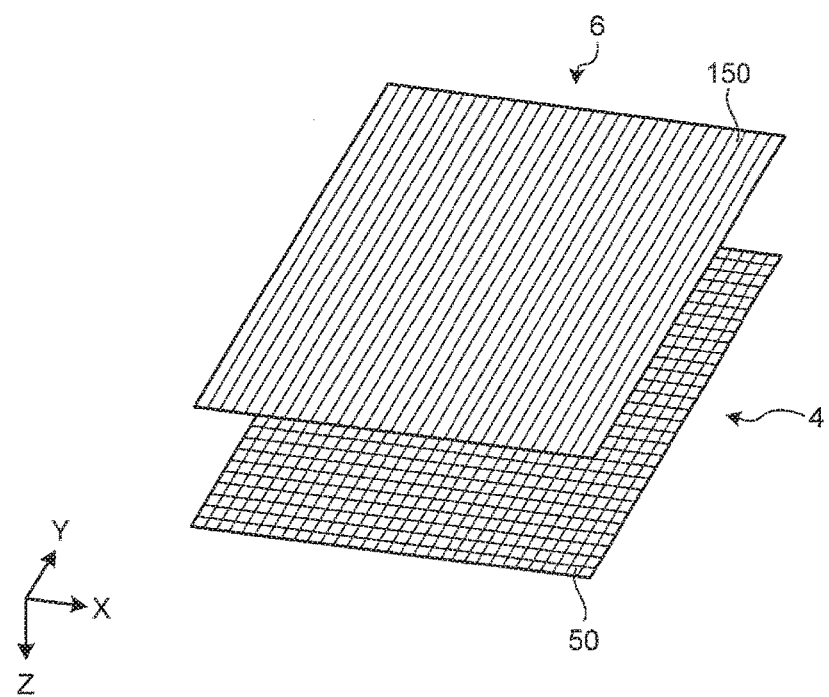
FIG. 3 is a perspective view illustrating a relation between pixels of the display part and a unit area of the barrier part.

FIG. 1 is a block diagram illustrating one example of a functional configuration of a display device according to the embodiment. FIG. 2 is a perspective view illustrating one example of constitution of a back light, a display part, and a barrier part in the display device illustrated in FIG. 1. FIG. 3 is a perspective view illustrating a relation between pixels of the display part and a unit area of the barrier part. FIG. 2 and FIG. 3 are schematically illustrated views, and the illustrated dimensions and shapes are not necessarily identical with actual dimensions and shapes. A display device 1 illustrated in FIG. 1 is one example of the display device of the present disclosure.

The display device 1 displays, for example, such an image that a user viewing a screen from a predetermined position can recognize as a three dimensional image with the naked eyes. The display device 1 has, as illustrated in FIG. 1, a backlight 2, a display part 4, a barrier part 6, an image pick-up unit 8, and a controller 9. In the display device 1, the backlight 2, the display part 4, and the barrier part 6 are, for example, stacked in this order.

The backlight 2 is a planar lighting device that emits planar light toward the display part 4. The backlight 2 has, for example, a light source and a light guide plate, and outputs the light from a light emission surface facing the display part 4 while scattering the light emitted from the light source by the light guide plate.

The display part 4 is a device that displays images. The display part 4 is a liquid crystal panel in which a large number of pixels are arranged in a two-dimensional array as illustrated in FIG. 3. The light emitted from the backlight 2 is incident on the display part 4. The display part 4 changes over, for example, the transmission of the light incident on each pixel 50 and the interruption of such light, thereby displaying images on a display surface (4S in FIG. 2, for example).

The barrier part 6 is an optical device. The barrier part 6 is arranged at a display surface (4S in FIG. 2, for example) of the display part 4 that displays images; that is, a surface opposite to the surface of the display part 4 that faces the backlight 2. In the barrier part 6, a plurality of unit areas 150 are arranged in a row, the unit areas 150 extending in a second direction (Y-axis direction illustrated in FIG. 2 and FIG. 3, for example) intersecting with a first direction (X-axis direction illustrated in FIG. 2 and FIG. 3, for example) horizontal to the display surface (4S in FIG. 2, for example) of the display part 4. In this embodiment, as one example, the second direction is perpendicular to the first direction. The barrier part 6 is a liquid crystal panel, and partially applies voltage to intended transmission areas or interruption areas to orient liquid crystals thus changing over the transmission and the interruption of light incident on each unit area 150 from a surface (6S in FIG. 2, for example) from which light is emitted. In this manner, the barrier part 6 adjusts the area that transmits images and the area that interrupts the images to be displayed on the display part 4. In place of the barrier part 6, a liquid crystal lens may be applied to the display device 1.

Display Part 4 and Barrier Part 6

Figure 4:
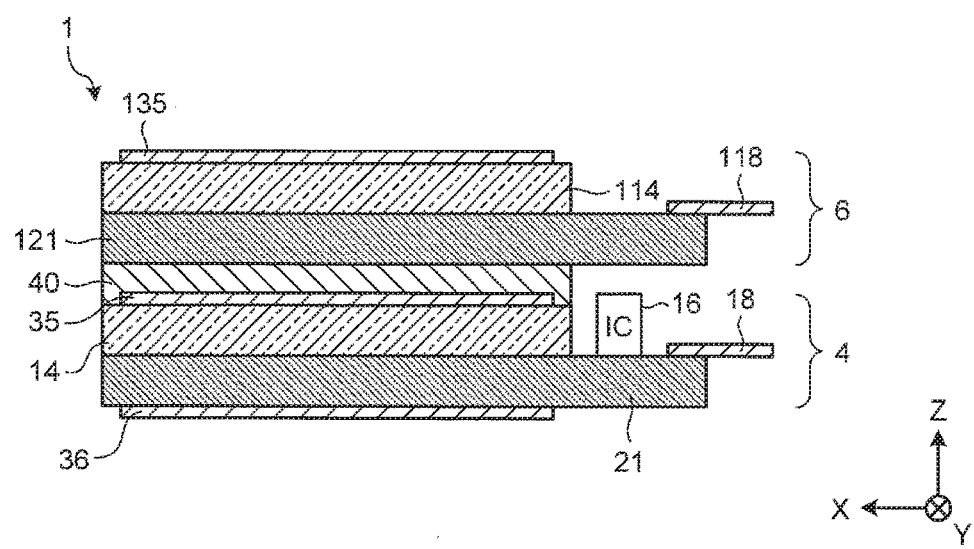
FIG. 4 is a schematic view illustrating a schematic constitution of a module on which the display part and a barrier part are mounted.
Figure 5:
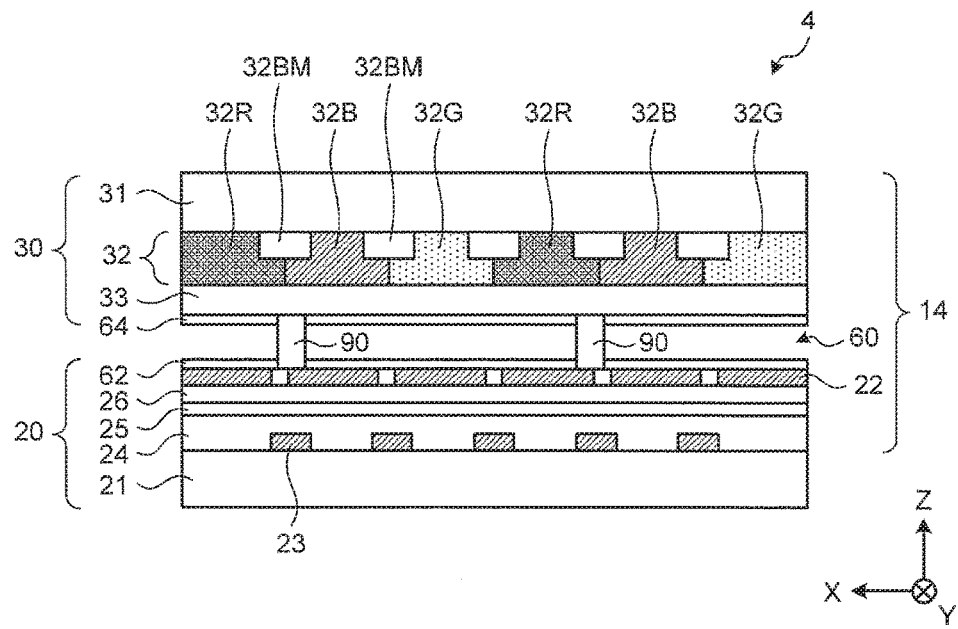
FIG. 5 is a partial sectional view illustrating a schematic structure of the display part.
Figure 6:
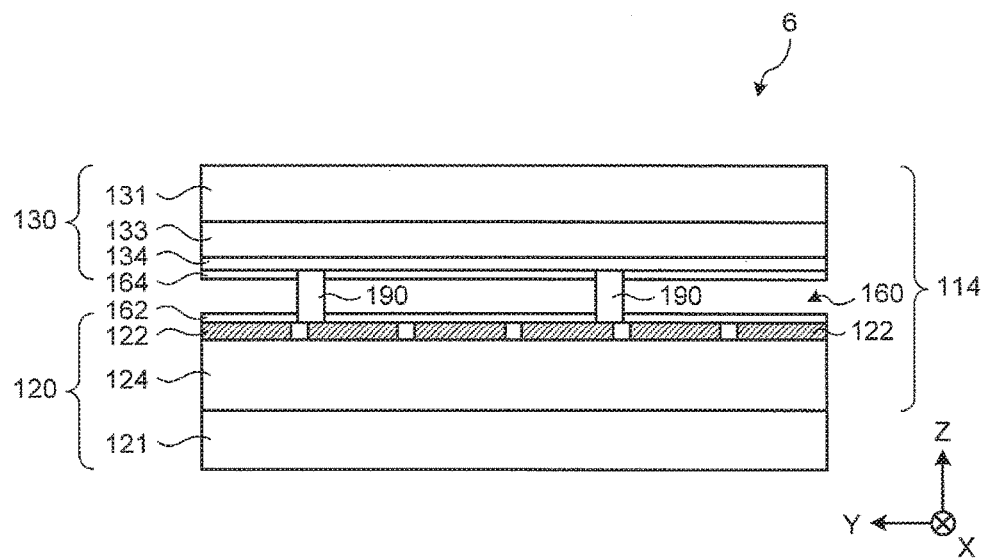
FIG. 6 is a partial sectional view illustrating a schematic structure of the display part.
Figure 7:
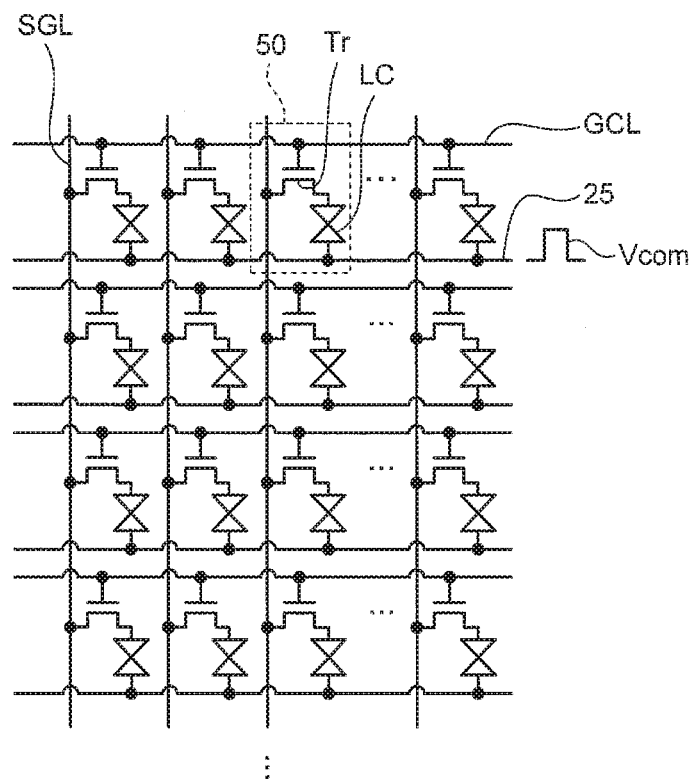
FIG. 7 is a circuit diagram of a circuit provided on a pixel substrate in the display part.
Figure 8:
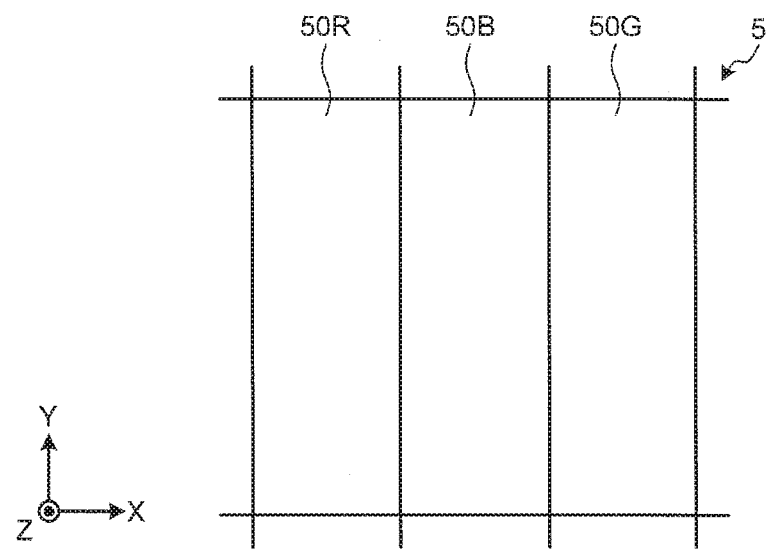
FIG. 8 is a schematic view of a pixel for color display.

Next, constitutional examples of the display part 4 and the barrier part 6 are explained. FIG. 4 is a schematic view illustrating a schematic constitution of a module on which the display part and the barrier part are mounted. FIG. 5 is a partial sectional view illustrating a schematic structure of the display part. FIG. 6 is a partial sectional view illustrating a schematic structure of the display part. FIG. 7 is a circuit diagram of a circuit provided on a pixel substrate in the display part. FIG. 8 is a schematic view of a pixel for color display.

In the display device 1, the display part 4 and the barrier part 6 are stacked as mentioned above, as illustrated in FIG. 4. In the display device 1, the display part 4 and the barrier part 6 are adhered to each other with an adhesive layer 40. The adhesive layer 40 is formed of a translucent adhesive that causes small change in transmittance with respect to translucent parts of the display part 4 and the barrier part 6; that is, a resin, for example. The display device 1 uses the adhesive layer 40 to adhere the display part 4 and the barrier part 6, thus enabling a state in which there exists no air layer between the display part 4 and the barrier part 6.

The display part 4 includes a translucent substrate 21, a pixel array portion 14 that is formed on the translucent substrate 21, a driver IC 16 that functions as an interface (I/F) and a timing generator, and a flexible printed circuit (FPC) board 18. In the display part 4, the pixel array portion 14, the driver IC 16, and the flexible printed circuit board 18 are mounted on the translucent substrate 21. In the display part 4, the pixel array portion 14 is stacked on the translucent substrate 21 in this manner. In the display part 4, a polarizer 35 is arranged on a side of the pixel array portion 14, which is opposite to the translucent substrate 21; that is, the polarizer 35 is arranged on the barrier part 6 side of the pixel array portion 14. In the display part 4, a polarizer 36 is arranged on a side of the translucent substrate 21, which is opposite to the pixel array portion 14; that is, the polarizer 36 is arranged on the backlight 2 side surface of the translucent substrate 21. That is, in the display part 4, the polarizer 36, the translucent substrate 21, the pixel array portion 14, and the polarizer 35 are stacked in the order given above from the backlight 2 to the barrier part 6. In the display part 4, the adhesive layer 40 is stacked on the polarizer 35.

The pixel array portion 14 has such a matrix (line-column) structure that units are arranged in a matrix array extending in m rows and in n columns, each of the units being such that the pixel 50 including a liquid crystal layer constitutes one pixel in displaying. Master clocks, horizontal synchronization signals, and vertical synchronization signals, which are external signals transmitted from the outside, are input to the driver IC 16. The driver IC 16 performs level conversion of the master clocks, the horizontal synchronization signals, and the vertical synchronization signals with voltage amplitude of an external power source into those with a level of voltage amplitude of an internal power source that is required for driving liquid crystals. The driver IC 16 generates vertical start pulses, vertical clock pulses, horizontal start pulses, and horizontal clock pulses by passing the master clocks, the horizontal synchronization signals, and the vertical synchronization signals that are level-converted through the timing generator. The driver IC 16 applies the generated signals to the pixel array portion 14. The flexible printed circuit board 18 is coupled to the translucent substrate 21 at one end thereof and coupled to an external circuit at the other end thereof. The flexible printed circuit board 18 is coupled with the driver IC 16 via the translucent substrate 21 and transmits the external signals or driving power for driving the driver IC 16 to the driver IC 16.

The barrier part 6 includes a translucent substrate 121, an electrode portion 114 formed on the translucent substrate 121, and a flexible printed circuit (FPC) board 118. As will be explained later, the barrier part 6 of the embodiment only switches over between display and non-display of a predetermined image and switches over display by using the electrode portion 114 on the translucent substrate 121. The display switching may be performed by using a driver coupled to the electrode portion 114. The barrier part 6 further includes a driver IC that functions as an interface (I/F) and a timing generator in addition to the driver. The barrier part 6 includes the electrode portion 114 and the flexible printed circuit board 118 on the translucent substrate 121. In this manner, the barrier part 6 has the electrode portion 114 stacked on the translucent substrate 121. The barrier part 6 has a polarizer 135 arranged on a side of the electrode portion 114 that is opposite to the translucent substrate 121; that is, on a side of a display surface that outputs images. That is, the barrier part 6 has the translucent substrate 121, the electrode portion 114, and the polarizer 135 stacked in the order given above from the display part 4 to the surface that outputs images. The barrier part 6 has the adhesive layer 40 stacked on a surface of the translucent substrate 121 that is opposite to the electrode portion 114. That is, the adhesive layer 40 is sandwiched between the polarizer 35 and the translucent substrate 121.

The electrode portion 114 has such a structure that units are arranged in one direction in a row, each of the units being such that a pixel (the unit area) 150 including a liquid crystal layer described later constitutes one pixel in displaying. The flexible printed circuit board 118 is coupled to the translucent substrate 121 at one end thereof and coupled to an external circuit at the other end thereof. The flexible printed circuit board 118 transmits external signals to a circuit of the translucent substrate 121 or transmits driving power for driving the circuit.

With reference to FIG. 5, the following describes the stacked structure of the display part 4 in greater detail. The display part 4 is what is called a transverse electric field type liquid crystal display panel such as a fringe field switching (FFS) type liquid crystal display panel. As the transverse electric field type liquid crystal display panel, an in-plane switching (IPS) type liquid crystal display panel may be used as well as the FFS type liquid crystal display panel. As illustrated in FIG. 5, the display part 4 has a pixel substrate 20 including the translucent substrate 21, a counter substrate 30 arranged to face the surface of the pixel substrate 20 in the vertical direction, and a liquid crystal layer 60 inserted between the pixel substrate 20 and the counter substrate 30. The display part 4 has, as described above, the polarizer 36 stacked on the pixel substrate 20 side surface of the display part 4 and the polarizer 35 stacked on the counter substrate 30 side surface of the display part 4.

The pixel substrate 20 has the translucent substrate 21, a plurality of pixel electrodes 22 arranged in a matrix array, signal lines 23, an organic insulating film 24, common electrodes 25, and an insulator layer 26. In the pixel substrate 20, the signal lines 23, the organic insulating film 24, the common electrodes 25, the insulator layer 26, and the pixel electrodes 22 are stacked on the surface of the translucent substrate 21 in the order given above. Thin film transistor (TFT) elements Tr (not illustrated in FIG. 5) each of which is coupled to the signal lines 23 and the pixel electrodes 22 are arranged on the translucent substrate 21 corresponding to the respective pixels. In the pixel substrate 20, various kinds of circuits are formed between the signal lines 23 stacked on the translucent substrate 21 and the organic insulation film 24. In the present specification, the translucent substrate 21 and a portion in which the circuits are formed constitute a TFT substrate.

The signal lines 23 are wirings such as pixel signal lines SGL that supply pixel signals to each pixel electrode 22 or scanning signal lines GCL that drive each TFT element Tr. Although the signal lines 23 are wirings formed in one layer in FIG. 5, the signal lines 23 may be formed in a plurality of layers stacked on each other via insulation layers.

The organic insulation film 24 is a film formed of an organic material such as silicon nitride that has an insulation property and laminated on surfaces of the signal lines 23 and the translucent substrate 21. The organic insulation film 24 suppresses conduction between the signal lines 23 and the other conductors at points except for coupling points on a circuit. Each of the common electrodes 25 is a sheet-like electrode laminated on the organic insulation film 24. Each of the common electrodes 25 is a translucent conductor formed of a translucent conductive material such as indium tin oxide (ITO) or indium zinc oxide (IZO). Each of the common electrodes 25 is coupled to a common electrode wiring explained later. In the embodiment, the common electrodes 25 and the pixel electrodes 22 are arranged such that one common electrode 25 and one pixel electrode 22 (the pixel electrode 22 that constitutes one row) correspond to each other. Instead of the common electrodes 25 in this embodiment, a plate-like electrode common to a plurality of pixel electrodes 22 may be provided. The common electrodes 25 of the embodiment face the pixel electrodes 22 in the direction perpendicular to the surface of the translucent substrate 21 (in the Z-axis direction illustrated in FIG. 2 and FIG. 3, for example), and extend in the direction parallel to the direction in which the above-mentioned pixel signal lines SGL extend. AC rectangular waveform common signals are applied to the common electrodes 25 from a drive electrode driver via a contact conductive pillar (not illustrated in the drawings) having conductivity. The insulation film 26 is laminated on the common electrodes 25. The pixel electrodes 22 are stacked on the insulation film 26. The pixel electrodes 22 are arranged for each pixel 50 (for each sub pixel in the case where each pixel 50 includes a plurality of sub pixels). Each of the pixel electrodes 22 is coupled with any of the pixel signal lines in the signal lines 23 and forms an electric field with the common electrodes 25 when voltage is applied to the pixel electrode 22 via the corresponding pixel signal line. The formed electric field changes depending on the voltage applied to the pixel electrode 22.

With reference to FIG. 7, the following describes a circuit configuration of pixels. The pixel signal lines SGL extend over a surface parallel to the surface of the translucent substrate 21 and supply pixel signals for displaying images to pixels. The pixel substrate 20 illustrated in FIG. 7 has a plurality of pixels 50 arranged in a matrix array. Each of the pixels 50 includes the TFT element Tr and a liquid crystal element LC. The TFT element Tr is, in the example illustrated in FIG. 7, made of a metal oxide semiconductor (MOS) type n-channel TFT. The source of the TFT element Tr is coupled to the pixel signal line SGL. The gate of the TFT element Tr is coupled to the scanning signal line GCL. The drain of the TFT element Tr is coupled to one end of the liquid crystal element LC. The liquid crystal element LC is coupled to the drain of the TFT element Tr at one end thereof and coupled to the common electrode 25 at the other end thereof.

The pixel 50 and the other pixels belonging to the same row in the pixel substrate 20 are coupled with each other via the corresponding scanning signal line GCL. Each of the scanning signal lines GCL is coupled with a gate driver that supplies scanning signals Vscan thereto. The pixel 50 and the other pixels belonging to the same column in the pixel substrate 20 are coupled with each other via the corresponding pixel signal line SGL. Each of the pixel signal lines SGL is coupled with a source driver that supplies pixel signals Vpix thereto. In addition, the pixel 50 and the other pixels belonging to the same row in the pixel substrate 20 are coupled with each other with the corresponding common electrode 25. Each of the common electrodes 25 is coupled with a drive electrode driver that supplies a common signal Vcom thereto. That is, in the example illustrated in FIG. 7, one common electrode 25 is shared by the pixels 50 belonging to one row.

In the display part 4, the scanning signal Vscan is supplied to the gate of the TFT element Tr of the pixel 50 by the gate driver via the scanning signal line GCL illustrated in FIG. 7 whereby one row (one horizontal line) of the pixels 50 formed in a matrix array in the pixel substrate 20 is sequentially selected as an object of display driving. In the display part 4, the pixel signals Vpix are supplied to the pixels 50 that are included in one horizontal line sequentially selected by the source driver via the pixel signal line SGL illustrated in FIG. 7. Furthermore, in the pixels 50, the display of one horizontal line is performed depending on the supplied pixel signals Vpix. In the display part 4, the common signals Vcom are supplied to drive the common electrodes 25.

As described above, in the display 4, the scanning signal lines GCL are driven by performing line sequential scanning of the scanning signal lines GCL in a time-sharing manner thus sequentially selecting one horizontal line. In the display part 4, the pixel signals Vpix are supplied to the pixels 50 belonging to one horizontal line thus displaying the horizontal line one by one. In performing display operations in the display part 4, the common signals Vcom are supplied to a block including the common electrodes 25 corresponding to the one horizontal line.

The counter substrate 30 comprises a glass substrate 31, a color filter 32 formed on one surface of the glass substrate 31, and an overcoat layer 33. A polarizer 35 is arranged on the other surface of the glass substrate 31. The barrier part 6 is stacked on the surface of the polarizer 35 that is opposite to the glass substrate 31. The overcoat layer 33 is stacked on the pixel substrate 20 side surface of the color filter 32. The overcoat layer 33 protects the color filter 32 against the other members.

The color filter 32 comprises an R filter 32R colored in red (R), a G filter 32G colored in green (G), and a B filter 32B colored in blue (B) that are cyclically arranged. In the color filter 32, a black matrix 32BM is arranged at a boundary between two filters out of the filters 32R, 32B, and 32G, and the areas of the respective filters 32R, 32B, and 32G are partitioned by the black matrixes 32BM. In the color filter 32, each of the colored filters 32R, 32B, and 32G is associated with each of the above-mentioned pixels 50 illustrated in FIG. 7. In the display part 4, three pixels each of which is associated with each of the three colored filters; that is, three pixels of a pixel 50 associated with the R filter 32R, a pixel 50 associated with the G filter 32G, and a pixel 50 associated with the B filter 32B constitute one unit pixel. To be more specific, as illustrated in FIG. 8, one pixel that constitutes a unit of forming a color image; that is, a unit pixel 5 includes, but are not limited to, a plurality of sub pixels. In this example, the unit pixel 5 includes a sub pixel 50R that displays a red color (R), a sub pixel 50B that displays a blue color (B), and a sub pixel 50G that displays a green color (G). The sub pixels 50R, 50B, and 50G in the unit pixel 5 are arranged in the X-axis direction; that is, in the row direction of the display device 1. The color filter 32 faces the liquid crystal layer 60 in the direction perpendicular to the surface of the translucent substrate 21 (in the Z-axis direction illustrated in FIG. 2 and FIG. 3, for example). The color filter 32 may have a combination of other colors as long as the colors of the filters are different from each other. That is, the unit pixel 5 may further include sub pixels having two or more colors. For example, the unit pixel 5 may have sub pixels each colored in white, cyan, magenta, yellow or the like in addition to three colors of R, G, and B.

The liquid crystal layer 60 is placed in an area between the pixel substrate 20 and the counter substrate 30, and liquid crystal is injected into the area. The liquid crystal layer 60 modulates light that passes therethrough depending on a state of an electric field. In the display part 4, an orientation film 62 is provided between the liquid crystal layer 60 and the pixel substrate 20, and an orientation film 64 is provided between the liquid crystal layer 60 and the counter substrate 30. The orientation films 62 and 64 change the orientation direction (rubbing direction) of the liquid crystal in the liquid crystal layer 60 to the predetermined direction.

In the display part 4 of the embodiment, a plurality of spacers 90 are arranged in the liquid crystal layer 60. Each of the spacers 90 is a pillar arranged extending in the direction perpendicular to the display surface. Each of the spacers 90 is brought into contact with the orientation film 62 at its end portion on the pixel substrate 20 side and with the orientation film 64 at its end portion on the counter substrate 30 side. Each of the spacers 90 is brought into contact with each of the pixel substrate 20 and the counter substrate 30 at each end portion thereof thus reducing the variation in thickness of the liquid crystal layer 60. The shape of the spacers 90 is not limited to the pillar, and the spacers 90 may be formed in a spherical shape or the like.

With reference to FIG. 6, the following describes the stacked structure of the barrier part 6 in greater detail. The barrier part 6 is a longitudinal electric field type liquid crystal display panel in which barrier electrodes (pixel electrodes) and a common electrode are arranged in such a manner that a liquid crystal layer is sandwiched therebetween. The barrier part 6 has a barrier substrate 120 including the translucent substrate 121, a counter substrate 130 arranged to face the surface of the barrier substrate 120 in the vertical direction, and a liquid crystal layer 160 inserted between the barrier substrate 120 and the counter substrate 130. In the barrier part 6, the polarizer 135 is stacked on the surface of the barrier part 6 at the side of the counter substrate 130.

The barrier substrate 120 has the translucent substrate 121, a plurality of barrier electrodes 122 arranged in a row, and an insulation film 124. In the barrier substrate 120, the insulation film 124 and the barrier electrodes 122 are stacked on the surface of the translucent substrate 121 in the order given above.

The insulation film 124 is a film formed of an insulative material and laminated on the surface of the translucent substrate 121. The insulation film 124 is formed of an insulative inorganic material such as silicon nitride (SiN) or an insulative organic material such as acrylic resin (PC material manufactured by JSD). The barrier electrode 122 is laminated on the insulation film 124. The barrier electrode 122 is formed in a shape similar to the shape of the unit area 150 illustrated in FIG. 3; that is, in an elongated plate-like shape extending along the second direction. The barrier electrodes 122 are arranged in a plurality of rows in the first direction. Voltage is applied to the barrier electrode 122 via the flexible printed circuit board 118. The barrier electrode 122 forms an electric field with the common electrode 134 when voltage is applied thereto. The electric field between the barrier electrode 122 and the common electrode 134 varies depending on the voltage applied to the barrier electrode 122. The constitution of the barrier electrode 122 is explained later.

The counter substrate 130 comprises a glass substrate 131, an overcoat layer 133 formed on one surface of the glass substrate 131, and the common electrode 134 arranged on the barrier-substrate-120 side of the overcoat layer 133. On the other surface of the glass substrate 131, a polarizer 135 is arranged. The common electrode 134 is a sheet-like electrode stacked on the overcoat layer 133. The common electrode 134 is a translucent conductor formed of a translucent conductive material such as ITO or IZO. The common electrode 134 is coupled to a common electrode wiring described later and functions as what is called a common electrode.

The common electrode 134 according to the embodiment functions as a common drive electrode (counter electrode) of the barrier part 6. The common electrode 134 of the barrier part 6 is driven so as to be synchronized over the entire region. However, the common electrode 134 may be divided into a plurality of parts in the direction in which the barrier electrodes are arranged. AC rectangular waveform common signals are applied to the common electrode 134 from a drive electrode driver via a contact conductive pillar (not illustrated in the drawings) having conductivity.

The liquid crystal layer 160 is placed in an area between the barrier substrate 120 and the counter substrate 130, and liquid crystal is injected into the area. The liquid crystal layer 160 modulates light that passes therethrough depending on a state of an electric field, and uses, for example, liquid crystal of various kinds of modes such as twisted nematic (TN), vertical alignment (VA), or electrically controlled birefringence (ECB). In the barrier part 6, an orientation film 162 is provided between the liquid crystal layer 160 and the counter substrate 120, and an orientation film 164 is provided between the liquid crystal layer 160 and the counter substrate 130. The orientation films 162 and 164 change the orientation direction (rubbing direction) of the liquid crystal in the liquid crystal layer 160 to the predetermined direction.

In the barrier part 6 of the embodiment, a plurality of spacers 190 are arranged in the liquid crystal layer 160. Each of the spacers 190 is a pillar arranged extending in the direction perpendicular to the display surface. Each of the spacers 190 is brought into contact with the orientation film 162 at its end portion on the barrier substrate 120 side and with the orientation film 164 at its end portion on the counter substrate 130 side. Each of the spacers 190 is brought into contact with each of the barrier substrate 120 and the counter substrate 130 at each end portion thereof thus reducing the variation in thickness of the liquid crystal later 160. The arrangement of the spacers 190 is explained later.

The display part 4 and the barrier part 6 are constituted as described above. By switching over a voltage applied to the pixel electrode 22 and a voltage applied to the barrier electrode 122 based on the signals from the controller 9, images viewable in a stereoscopic manner by a user is displayed. The display part 4 and the barrier part 6 are coupled with each other by the adhesive layer 40.

The image pick-up unit 8 is an apparatus such as a camera that picks up images. For example, a display device that controls the barrier part 6 to display three dimensional images uses what is called a head tracking technique or the like. The head tracking technique controls the transmission and interruption of light in the barrier part 6 based on the position information of a user so that an image for a right eye is incident on the right eye of the user and an image for a left eye is incident on the left eye of the user. The image of the user acquired by the image pick-up unit 8 is used for specifying the position of the user (eyeball position, for example).

The controller 9 controls operations of each part in the display device 1. To be more specific, the controller 9 controls the turning on and off of the backlight 2, and the quantity of light and the intensity of light when turning on the backlight 2, controls an image displayed on the display part 4, controls the operation (transmission, interruption) of each unit area 150 in the barrier part 6, and controls the image pick-up operation of the image pick-up unit 8. The controller 9 uses the image of a user that is picked up by the image pick-up unit 8 to perform head tracking and controls the image displayed on the display part 4 and the operation (transmission, interruption) of each unit area 150 in the barrier part 6 thus achieving the display of a three dimensional image.

The controller 9 includes, for example, a central processing unit (CPU) that is an arithmetic unit and a memory that is a storage device, and uses these hardware resources to execute programs thus also achieving various kinds of functions. To be more specific, for example, the controller 9 reads out a program stored in a storage unit (not illustrated in the drawings), loads the program into a memory, and causes the CPU to execute commands included in the program loaded into the memory. The controller 9 controls, depending on the results of executing the commands by the CPU, the turning on and off of the backlight 2, and the quantity of light and the intensity of light when turning on the backlight 2, controls an image displayed on the display part 4, and controls the operation (transmission, interruption) of each unit area 150 in the barrier part 6.

Figure 9:
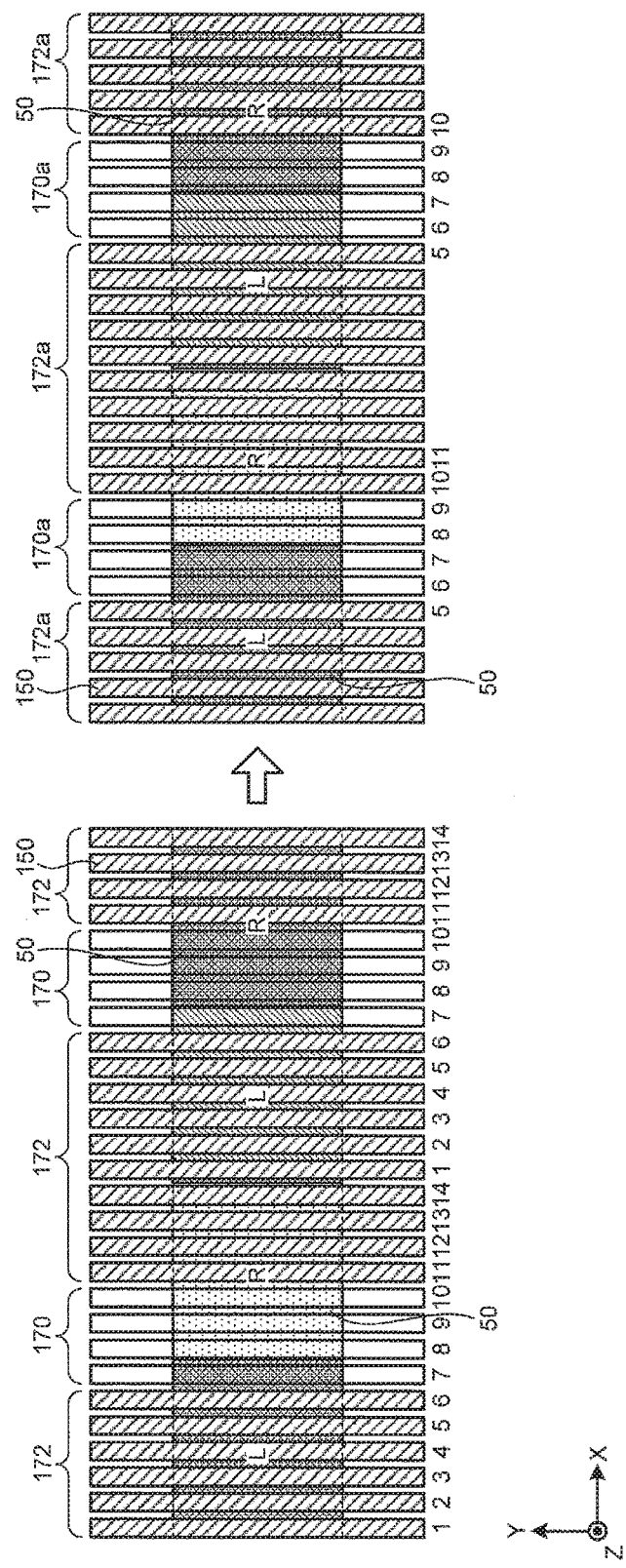
FIG. 9 is a schematic view illustrating the relation between the barrier part and pixels.
Figure 10:
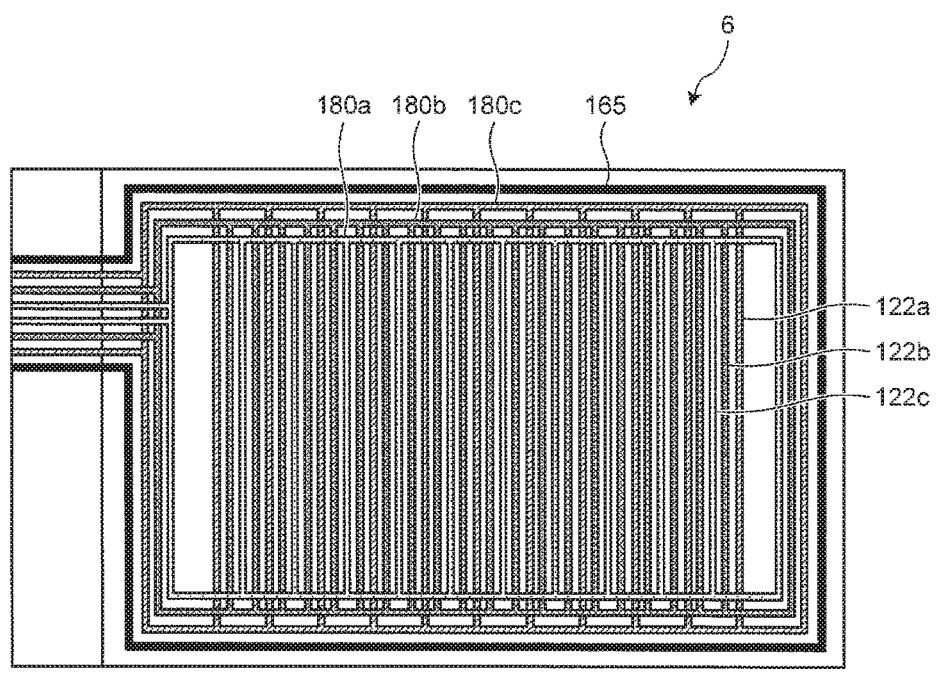
FIG. 10 is a front view schematically illustrating pixel electrodes and wiring of the barrier part.
Figure 11A:
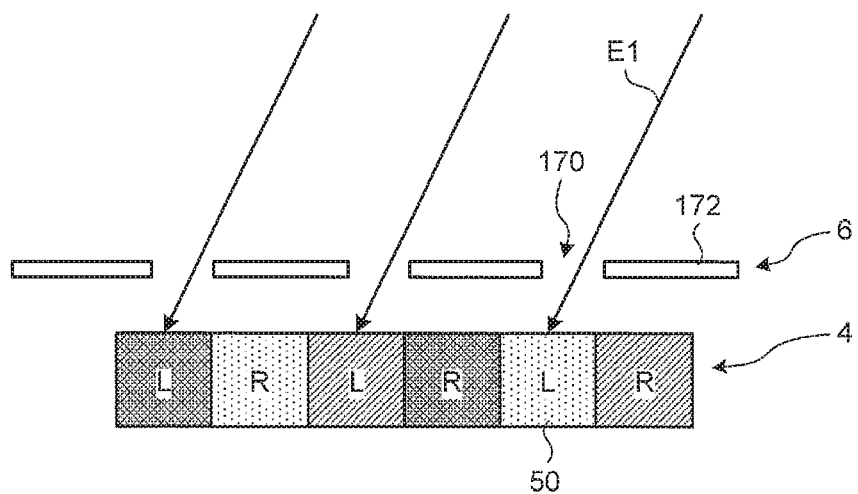
FIG. 11A is a schematic view illustrating the relation between pixels of the display part and lines of sight.
Figure 11B:
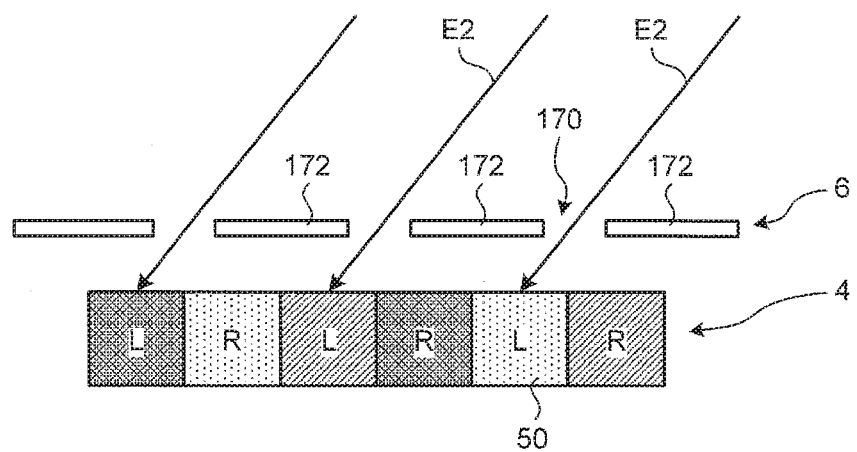
FIG. 11B is a schematic view illustrating the relation between pixels of the display part and lines of sight.

With reference to FIGS. 9 to 11, the following describes the operation of the display device 1. FIG. 9 is a schematic view illustrating the relation between the barrier part and pixels. FIG. 10 is a front view schematically illustrating pixel electrodes and wiring of the barrier part. FIG. 11A and FIG. 11B are schematic views each illustrating the relation between pixels of the display part and lines of sight.

As illustrated in FIG. 9, the display device 1 drives a part of the unit areas (pixels) 150 of the barrier part 6 as light transmission areas 170 and the remaining unit areas (pixels) 150 as light interruption areas 172 when a three dimensional image is displayed. The light transmission area 170 is an area that transmits light, and the light interruption area 172 is an area that interrupts light. The display device 1 switches over voltage applied to the respective barrier electrodes 122 thus driving a part of the unit areas (pixels) 150 of the barrier part 6 as the light transmission areas 170 and the remaining unit areas (pixels) 150 as the light interruption areas 172. In the barrier part 6, as illustrated in FIG. 10, barrier lines 180a, 180b, and 180c are coupled to a plurality of barrier electrodes 122a, 122b, and 122c, respectively. The barrier lines 180a, 180b, and 180c couple the barrier electrodes 122 and an external circuit. The barrier lines 180a, 180b, and 180c are coupled to the barrier electrodes 122 for each predetermined number of the barrier electrodes 122 out of the barrier electrodes 122 arranged in parallel with each other. Therefore, in the barrier part 6, the electric potentials of the barrier electrodes 122 being coupled to the same barrier line can be equal to each other. In the barrier part 6, a common electrode wiring 165 is arranged that couples the common electrode 134 and an external circuit around the barrier lines 180a, 180b, and 180c.

In the barrier part 6, a barrier line is coupled to a plurality of barrier electrodes for each predetermined number of the barrier electrodes; that is, in the barrier part 6 in FIG. 9, each of 14 barrier lines is coupled to the barrier electrode 122 with the same number as the barrier line out of the barrier electrodes 122 with the numbers 1 to 14 thus changing the position of the transmission area 170 and the position of the interruption area 172 in an interlocking manner. For example, a pattern on the left side of FIG. 9 illustrates a state in which an area corresponding to the barrier electrodes 122 with the numbers 7 to 10 functions as the transmission area 170. If a voltage applied to a barrier line coupled to the barrier electrode 122 with the number of 6 and a voltage applied to a barrier line coupled to the barrier electrode with the number of 10 are switched over each other, the positions of the transmission area 170 and the interruption area 172 change from the state illustrated in the pattern on the left side of FIG. 9 to a state in which an area corresponding to the barrier electrodes 122 with the numbers 6 to 9 functions as a transmission area 170a as illustrated in a pattern on the right side of FIG. 9. In this manner, the position of the transmission area 170a and the position of an interruption area 172a can be easily switched over each other. In the barrier part 6, each of the barrier lines 180a, 180b, and 180c is coupled to the barrier electrodes 122, thus switching over a display without providing a switching circuit.

In this manner, the display device 1 detects the position of a viewer, makes a determination of the patterns of the transmission area 170 and the interruption area 172, and applies a voltage to each barrier line based on the determination thus providing the transmission area 170 and the interruption area 172. The display device 1 specifies the field of view of each eye of the viewer with respect to the pixel of the display part 4 based on the position of the transmission area 170 and the position of the viewer, determines an image to be displayed by pixels (sub pixels) included in the field of view, and displays the image for each eye. That is, the position of a pixel (sub pixel) to which a line of sight of a right eye or a line of sight of a left eye reaches through the transmission area 170 is specified, and the image for each eye is displayed at the position. Accordingly, the image for each eye can be viewed by each eye. In this case, a focusing position of the image to be displayed for each eye deviates depending on the position of the pixel thus displaying an image such that the viewer can recognize an image as a three dimensional image. Accordingly, if the angle of a line of sight E1 is close to 90 degrees as illustrated in FIG. 11A, and even if the angle of a line of sight E2 is smaller than the angle of the line of sight E1 as illustrated in FIG. 11B, the image for each eye can be displayed at the position of the pixel to which the line of sight E1 or the line of sight E2 reaches.

Figure 12:
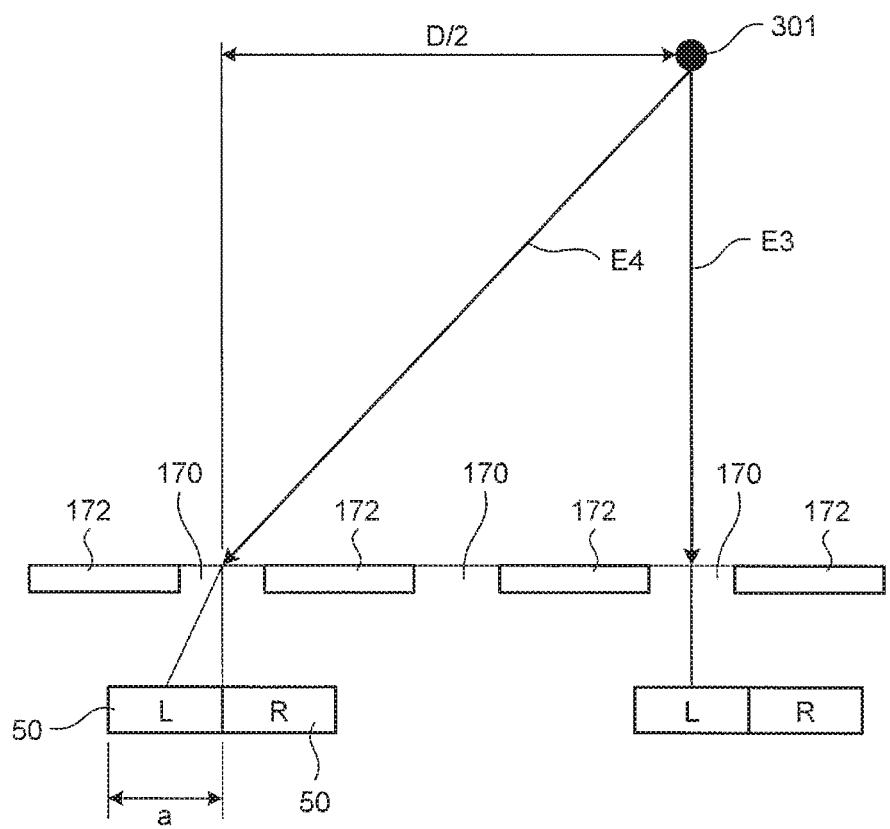
FIG. 12 is a schematic view illustrating the relation among the display part, a view point, and lines of sight.

FIG. 12 is a schematic view illustrating the relation among the display part, a view point, and lines of sight. In the display device 1, as illustrated in FIG. 12, the position of a transmission area 170 that overlaps with a line of sight E3 when the center position of a display surface is viewed from a view point 301 and the position of a pixel 50 are identical with each other in the direction in which barrier electrodes are arranged (in other words, in the direction perpendicular to the longitudinal direction of the barrier electrodes on the display surface). On the other hand, in the display device 1, the position of a transmission area 170 that overlaps with a line of sight E4 when a position placed apart from the center of the display surface by the distance of D/2 (one-half of a distance D between eyes; D is 6.5 cm, for example) is viewed from the view point 301 and the position of the pixel 50 deviates from each other by approximately a/2 in the direction in which barrier electrodes are arranged (in other words, in the direction perpendicular to the longitudinal direction of the barrier electrodes on the display surface), where "a" represents a pitch of pixels. Therefore, in the display device, it is preferable to move a pattern of connecting barrier lines or a pitch of arranging barrier electrodes based on the deviation of the position of the transmission area from the position of the pixel 50. To be more specific, it is preferable to set the pitch of the barrier electrodes to a value obtained by an expression such that $2a-(a/2)/((D/2)/2a)=2a-2a^2/D$. The pitch of arranging the barrier electrodes is not limited to the value obtained by the expression above, and may be deviated from the pitch of arranging the pixels based on the other criteria.

Figure 13:
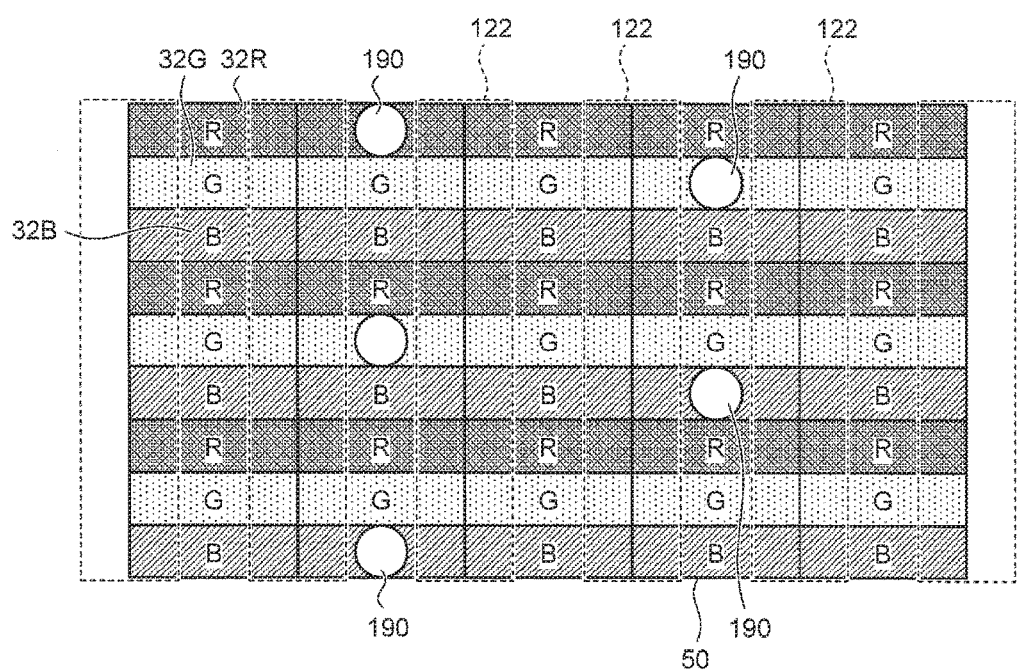
FIG. 13 is a schematic view illustrating the relation among color filters, spacers of the barrier part, and barrier electrodes of the barrier part.
Figure 14:
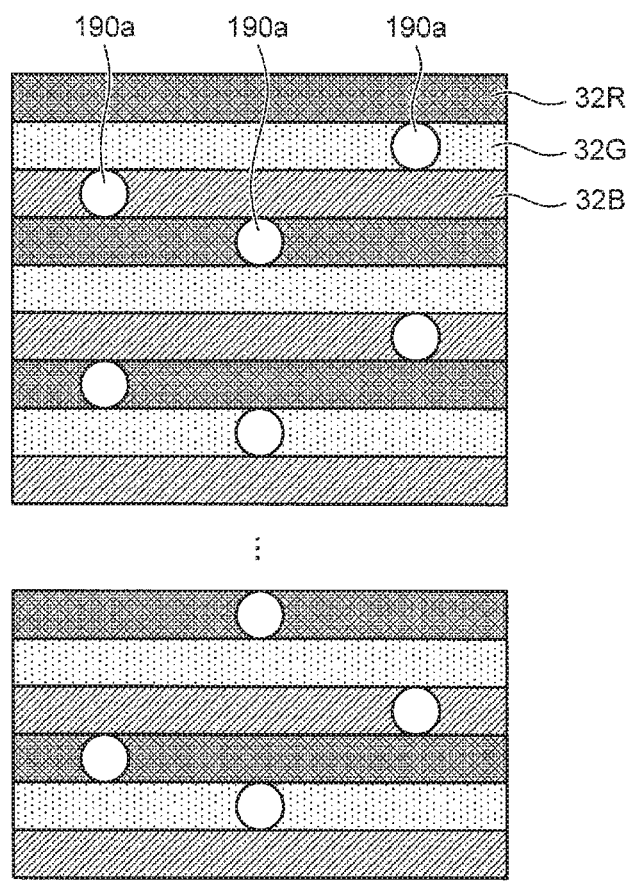
FIG. 14 is a schematic view illustrating the relation among color filters, and spacers of the barrier part.
Figure 15:
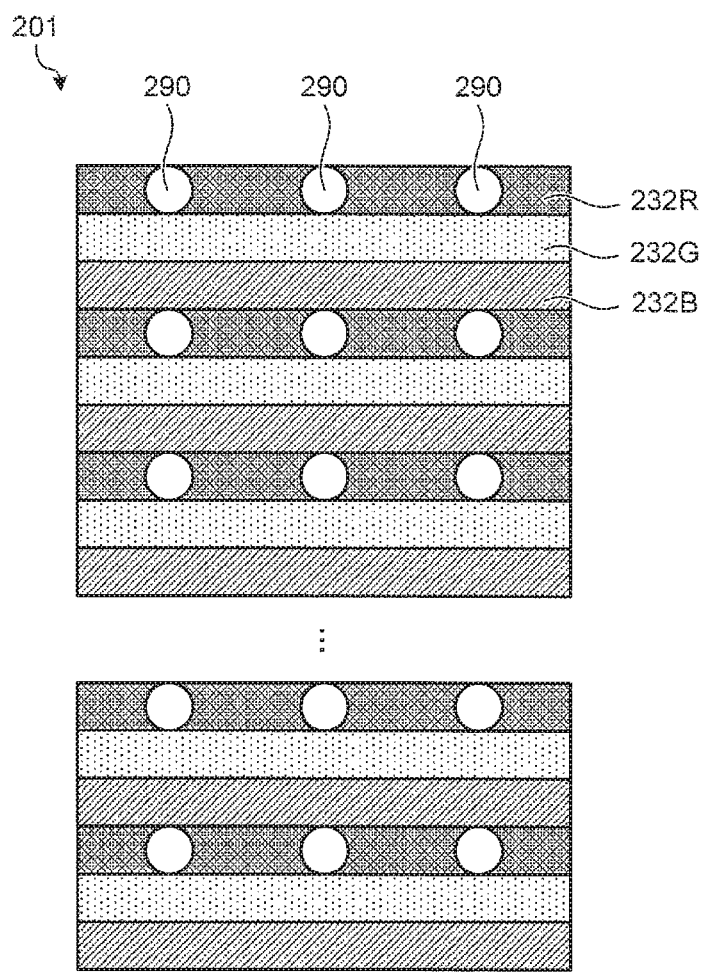
FIG. 15 is a schematic view illustrating the relation among color filters, and spacers of a barrier part in a comparative example.
Figure 16:
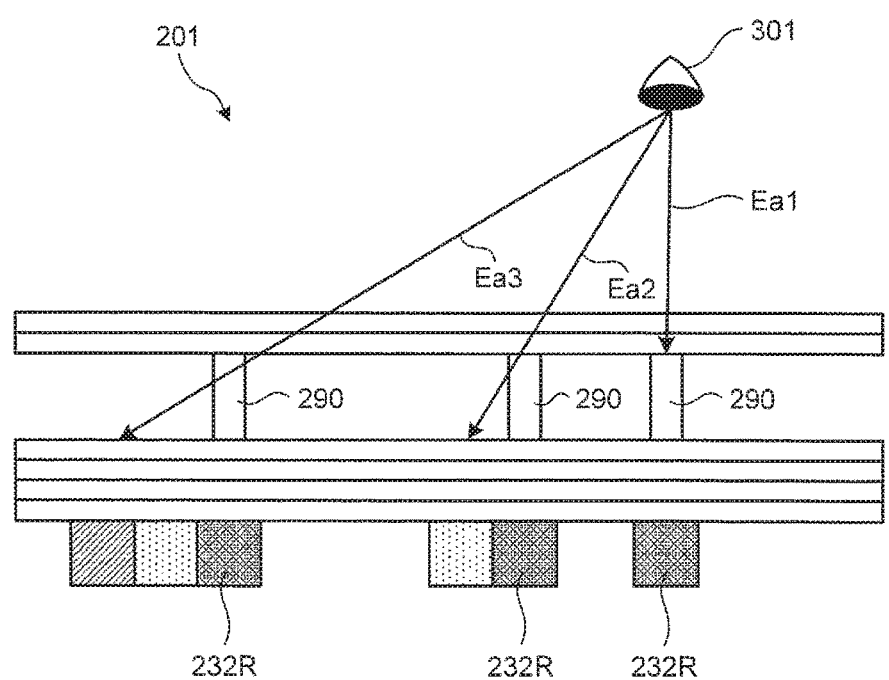
FIG. 16 is a schematic view illustrating the relation among lines of sight, spacers, and color filters.

The following describes a spacer provided to the barrier part 6. FIG. 13 is a schematic view illustrating the relation among color filters, spacers of the barrier part, and barrier electrodes of the barrier part. FIG. 14 is a schematic view illustrating the relation among the color filters, and the spacers of the barrier part. FIG. 15 is a schematic view illustrating the relation among color filters, and spacers of a barrier part in a comparative example. FIG. 16 is a schematic view illustrating the relation among lines of sight, spacers, and color filters.

In the barrier part 6 of the display device 1, as illustrated in FIG. 13, each spacer 190 is arranged between adjacent barrier electrodes 122; that is, between one barrier electrode 122 out of a plurality of barrier electrodes 122 and the other barrier electrode 122 adjacent to the one barrier electrode 122. That is, each the spacer 190 is arranged at a position so as not to be overlapped with any of the barrier electrodes 122 when viewed in the direction perpendicular to the display surface.

In the barrier part 6, the position of forming the spacer 190 is a position such that an arrangement pitch of one spacer 190 with respect to the other spacer 190 adjacent to the one spacer 190 in the direction in which the barrier electrodes 122 are arranged in line (arranging direction, first direction) is different from an arrangement pitch of one spacer 190 with respect to the other spacer 190 adjacent to the one spacer 190 in the direction in which the respective colored filters of the color filter 32 are arranged in line. That is, the spacers 190 are arranged such that a distance between one spacer 190 and the other spacer 190 adjacent to the one spacer 190 in the direction in which the barrier electrodes are arranged in line is different from a distance equal to an integral multiple of an arrangement pitch of one spacer 190 with respect to the other spacer 190 adjacent to the one spacer 190 in the direction in which the respective colored filters of the color filter are arranged in line.

In the barrier part 6, the spacers 190 are arranged such that a distance between one spacer 190 and the nearest spacer 190 to the one spacer 190 among spacers 190 adjacent to the one spacer 190 in directions other than a direction in which the barrier electrodes 122 are extended is different from a distance between the one spacer 190 and the other spacer 190 adjacent to the one spacer 190 in the direction in which the respective colored filters of the color filter 32 are arranged in line. To be more specific, the spacers 190 are arranged such that a distance between one spacer 190 and the nearest spacer 190 to the one spacer 190 among spacers 190 adjacent to the one spacer 190 in the directions other than the direction in which the barrier electrodes 122 are extended is different from a distance equal to an integral multiple of a distance between the one spacer 190 and the other spacer 190 adjacent to the one spacer 190 in the direction in which the respective colored filters of the color filter 32 are arranged in line. In the embodiment, the direction in which the barrier electrodes 122 are extended, and the direction in which the respective colored filters of the color filter 32 are arranged correspond to the second direction.

In the barrier part 6, when viewed in the direction perpendicular to the display surface, an arrangement pitch of a plurality of spacers 190 in the direction in which the filters 32R, 32G, and 32B colored in different colors of the color filter 32 are arranged is different from an arrangement pitch of the filters 32R, 32G, and 32B.

In the display device 1, as illustrated in FIG. 14, spacers 190a may be arranged at a fixed pitch in the extending direction of the barrier electrodes (that is, in the second direction). However, the embodiment is not limited to this example. In the display device 1, the spacers 190a may be arranged at random in the extending direction of the barrier electrodes (in the second direction) as long as one spacer 190a is overlapped with one of the filters 32R, 32G, and 32B whose color is different from the color of the other one of the filters 32R, 32G, and 32B with which the other spacer 190a adjacent to the one spacer in the extending direction of the barrier electrodes (in the second direction) is overlapped. In the display device 1, the spacers 190a may be arranged at random in directions other than the extending direction of the barrier electrodes as long as one spacer is overlapped with one of the filter 32R, 32G, and 32B whose color is different from the color of the other one of the filter 32R, 32G, and 32B with which the nearest spacer to the one spacer among spacers adjacent to the one spacer in the directions other than the extending direction of the barrier electrodes 122 is overlapped. For example, the spacers 190a may be arranged such that a distance between one spacer 190 and the nearest spacer 190 to the one spacer 190 among spacers 190 adjacent to the one spacer 190 in the directions other than the direction in which the barrier electrodes 122 are extended is different from a distance equal to an arrangement pitch of the filters of colors identical with each other in the direction other than the direction in which the barrier electrodes 122 are extended. Further, for example, the spacers 190a may be arranged such that a distance between one spacer 190 and the nearest spacer 190 to the one spacer 190 among spacers 190 adjacent to the one spacer 190 in the directions other than the direction in which the barrier electrodes 122 are extended is different from a distance equal to an integral multiple of an arrangement pitch of the filters of colors identical with each other in the direction other than the direction in which the barrier electrodes 122 are extended.

In the display device 1, the spacer 190 is arranged between the barrier electrodes 122, thereby reducing adverse effects exerted on the conduction or the like of the barrier electrode 122 due to the transmission of a load applied to the spacer 190 to the barrier electrode 122.

In the display device 1, the spacers 190 are arranged such that a distance between one spacer 190 and the other spacer 190 adjacent to the one spacer 190 in the direction in which the barrier electrodes are extended is different from a distance equal to an integral multiple of an arrangement pitch of the filters of colors identical with each other in the direction in which the respective colored filters of the color filter are arranged in line. The spacers are arranged at intervals mentioned above thus placing the spacers on the filters colored in different colors irrespective of a relative position between the display part 4 and the barrier part 6.

In a display device 201 of a comparative example illustrated in FIG. 15, spacers 290 are arranged at positions overlapping with a filter 232R colored in red out of the three-color filters 232R, 232G, and 232B. That is, in the display device 201, one spacer 290 is overlapped with a filter whose color is identical with the color of the other filter with which the other spacer 290 adjacent to the one spacer 290 in the extending direction of barrier electrodes and in the arrangement direction of the barrier electrodes is overlapped.

In the display device 201, the spacers 290 are formed on the same color filters 232 in the extending direction of the barrier electrode and hence, as illustrated in FIG. 16, the inclination angle of a line of sight with respect to the surface of the display part based on a view point 301 decreases along with the increase of a distance between a position right in front of the view point 301 and a position of the line of sight in the extending direction of the barrier electrodes 122; that is, in order of lines of sight Ea1, Ea2, and Ea3. Accordingly, even in the case where the spacers 290 are stacked on the filters 232R of same colors, the color of light that passes through the spacer 290; that is, the color of the light that passes through the spacer 290 and goes to the view point 301 varies depending on the position of the spacer 290. That is, the line of sight Ea1 passes through a red filter 232R and through a spacer 290, the line of sight Ea2 passes through a green filter 232G adjacent to the red filter 232R and through a spacer 290, and the line of sight Ea3 passes through the blue filter 232B second to the red filter 232R and through a spacer 290. In this manner, in the display device 201, the color of the light that passes through a spacer varies depending on the position of the spacer in the extending direction of the barrier electrodes. The change in color of the light in such a case causes iridescent moire fringes.

In contrast, in the display device 1, as described above, one spacer 90 is stacked on a filter of a color different from the color of a filter on which the other spacer 90 adjacent to the one spacer 90 in the extending direction of the barrier electrodes is stacked thus gradually changing a color R, G, or B of light passing through the spacer and preventing the occurrence of moire.

Figure 17:
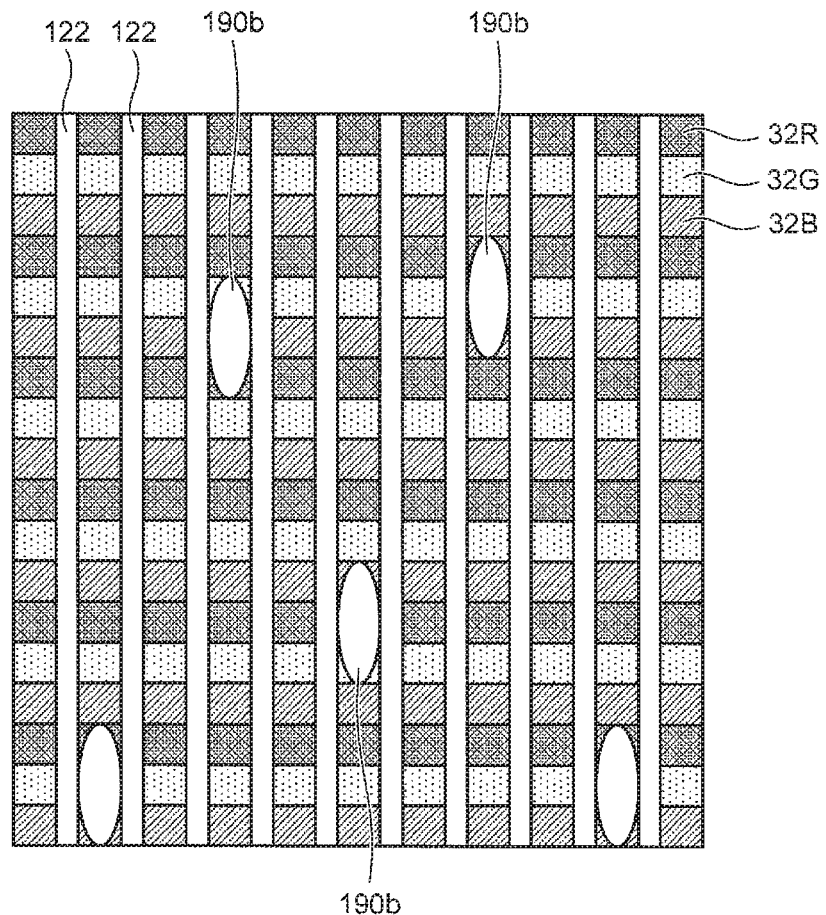
FIG. 17 is a schematic view illustrating the relation among color filters, spacers of the barrier part, and barrier electrodes of the barrier part.

FIG. 17 is a schematic view illustrating the relation among the color filter, a spacer of the barrier part, and the barrier electrode of the barrier part. In a display device illustrated in FIG. 17, as viewed from the direction perpendicular to a display surface, a spacer 190b is formed in a shape elongated in the extending direction of the barrier electrodes 122. In this manner, the spacers 190b are formed in a shape elongated in the extending direction of the barrier electrodes 122; that is, an aspect ratio of the shape of the spacers is set larger than 1 thus preferably arranging the spacers 190b even when the space between the barrier electrodes 122 is narrowed.

It is preferable that the spacer 190b be arranged in such an area that the spacer 190b overlaps with a plurality of filters colored in different colors in the extending direction thereof. This constitution can prevent the occurrence of moire more preferably. In addition, it is preferable that the spacer 190b be arranged in such an area that the spacer 190b overlaps with filters colored in all colors. This constitution can prevent the occurrence of moire further preferably.

Figure 18:
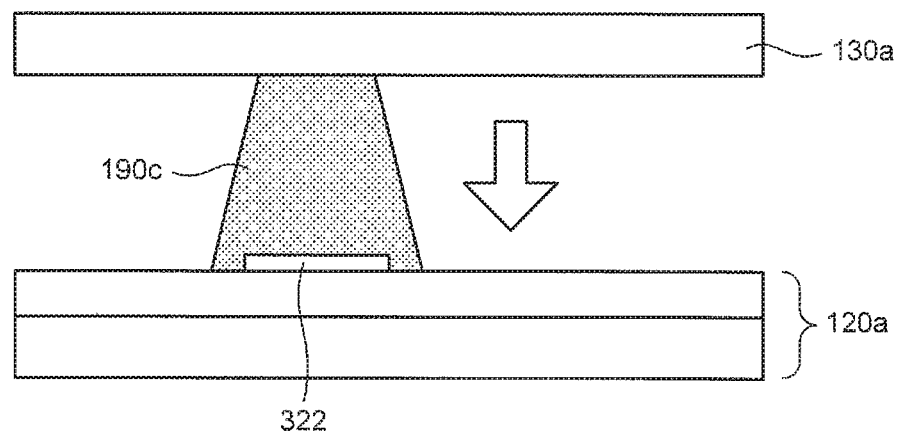
FIG. 18 is a sectional view illustrating a schematic constitution of one example of the spacer.

FIG. 18 is a sectional view illustrating a schematic constitution of one example of a spacer. In the display device 1, as illustrated in FIG. 18, a spacer 190c is formed in such a shape that a sectional area (along a section parallel to the display surface) is gradually increased from a counter substrate 130 toward a pixel substrate 120a a. To be more specific, the spacer 190 is formed in a circular truncated conical pillar shape with a width gradually increased toward the pixel substrate 120a from the counter substrate 130a as viewed in a sectional view taken along a surface parallel to the axial direction.

As illustrated in FIG. 18, the spacer 190c is formed in such a shape that the sectional area is gradually increased toward the pixel substrate 120a from the counter substrate 130a; that is, toward the barrier substrate from the counter substrate thus dispersing and reducing a force applied to the pixel substrate 120a. This constitution can reduce adverse effects exerted on the pixel substrate 120a at a position at which the spacer is placed.

In the display device illustrated in FIG. 18, the spacer 190c is overlapped with a barrier electrode 322. In this manner, the display device includes the spacer 190c formed in such a shape that the sectional area is gradually increased toward the pixel substrate 120a thus reducing adverse effects exerted on the barrier electrode 322, even when the spacer 190c is arranged on the barrier electrode 322 in an overlapping manner.

In the display device, when the spacer 190c is used, the spacer 190c can be arranged with respect to the color filters in a manner described above thus acquiring the above-mentioned advantages and reducing adverse effects exerted on the barrier electrode 322 due to the shape of the spacer. In the display device illustrated in FIG. 18, a spacer arranged at least at a position overlapped with any of the barrier electrodes 322 is formed in a shape of the above-mentioned spacer 190c thus acquiring the above-mentioned advantages. In the display device illustrated in FIG. 18, adverse effects exerted on a barrier electrode can be reduced while the spacers 190c are arranged at random.

The above-mentioned embodiment has been explained by taking a display device that displays three dimensional images as an example. However, the embodiment may be applied to a dual display device that displays different images for two viewers located on the right and left sides of the screen of the display device. In this case also, the above-mentioned constitution is adopted thus preventing the occurrence of moire while preventing the occurrence of defects in pixels. The display device according to the embodiment can be applicable to a multi-view presentation display device for displaying two or more viewpoint images.

2. APPLICATION EXAMPLES

As application examples of the present disclosure, examples for applying the above-mentioned display device 1 to electronic apparatuses are explained.

FIG. 19 to FIG. 31 are views each illustrating an example of an electronic apparatus including the display device according to the embodiment. The display device 1 of the embodiment can be applied to electronic apparatuses of all fields, such as portable electronic apparatuses including mobile phones and smart phones, television devices, digital cameras, notebook type personal computers, video cameras, and meters provided to vehicles. In other words, the display device 1 of the embodiment can be applied to electronic apparatuses of all fields that display video signals input thereto from the outside thereof or video signals generated therein as images or videos. The electronic apparatus includes a controller that supplies video signals to the display device and controls operations of the display device.

Application Example 1

Figure 19:
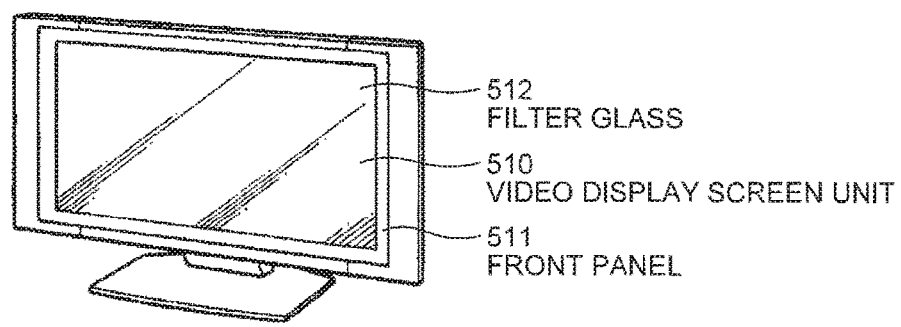
FIG. 19 is a view illustrating one example of an electronic apparatus including a display device according to the embodiment.

The electronic apparatus illustrated in FIG. 19 is a television device to which the display device 1 according to the embodiment is applied. The television device has, for example, a video display screen unit 510 that includes a front panel 511 and a filter glass 512. The video display screen unit 510 is the display device of the embodiment.

Application Example 2

Figure 20:
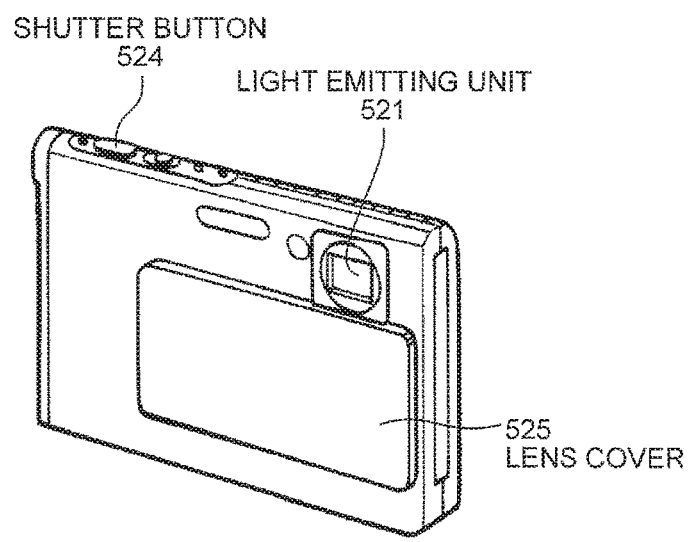
FIG. 20 is a view illustrating one example of an electronic apparatus including a display device according to the embodiment.
Figure 21:
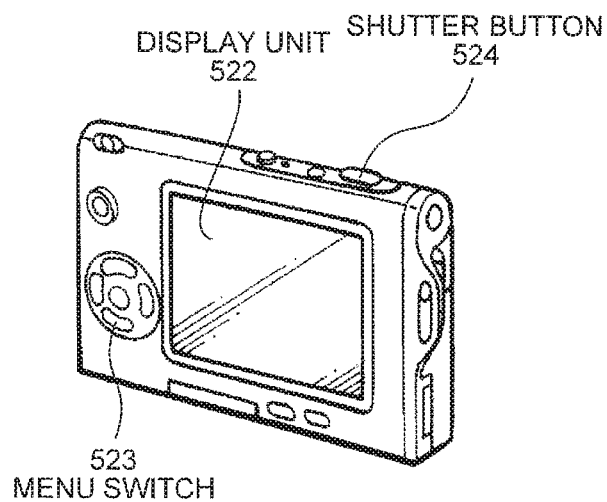
FIG. 21 is a view illustrating one example of an electronic apparatus including a display device according to the embodiment.

The electronic apparatus illustrated in FIG. 20 and FIG. 21 is a digital camera to which the display device 1 according to the embodiment is applied. The digital camera has, for example, a light emitting unit 521 for flash, a display unit 522, a menu switch 523, and a shutter button 524. The display unit 522 is the display device of the embodiment. As illustrated in FIG. 20, the digital camera has a lens cover 525, and the lens cover 525 is slid thus exposing a taking lens. The digital camera picks up light emitted from the taking lens thus taking a digital photograph.

Application Example 3

Figure 22:
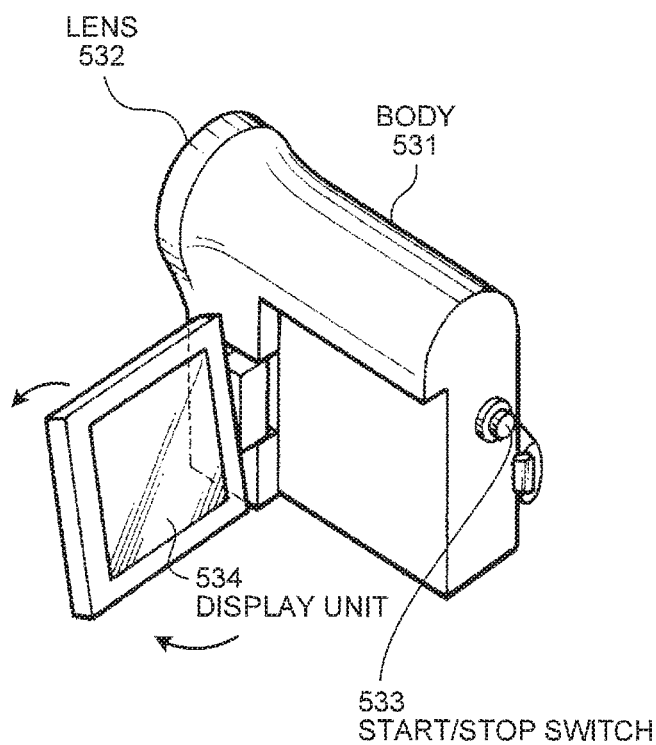
FIG. 22 is a view illustrating one example of an electronic apparatus including a display device according to the embodiment.

The electronic apparatus illustrated in FIG. 22 represents an external appearance of a video camera to which the display device 1 according to the embodiment is applied. The video camera has, for example, a body 531, a lens 532 for capturing a subject that is provided to the front side face of the body 531, a start/stop switch 533 and a display unit 534 that are used in photographing. The display unit 534 is the display device of the embodiment.

Application Example 4

Figure 23:
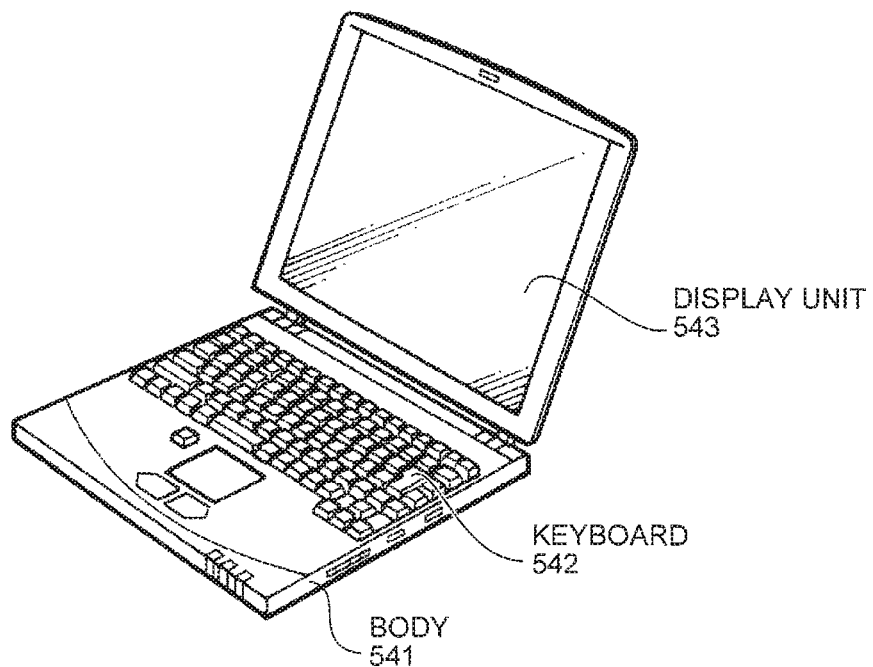
FIG. 23 is a view illustrating one example of an electronic apparatus including a display device according to the embodiment.

The electronic apparatus illustrated in FIG. 23 is a notebook type personal computer to which the display device 1 according to the embodiment is applied. The notebook type personal computer has, for example, a body 541, a keyboard 542 for input operations of characters, and a display unit 543 that displays images. The display unit 543 is constituted of the display device of the embodiment.

Application Example 5

Figure 24:
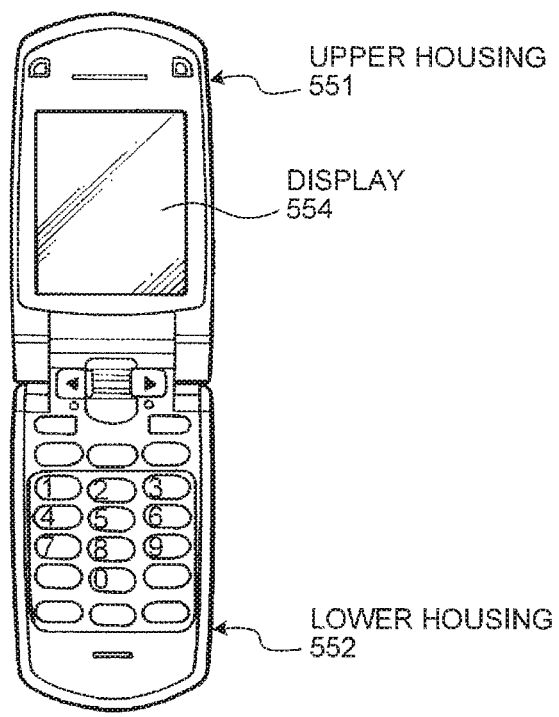
FIG. 24 is a view illustrating one example of an electronic apparatus including a display device according to the embodiment.
Figure 25:
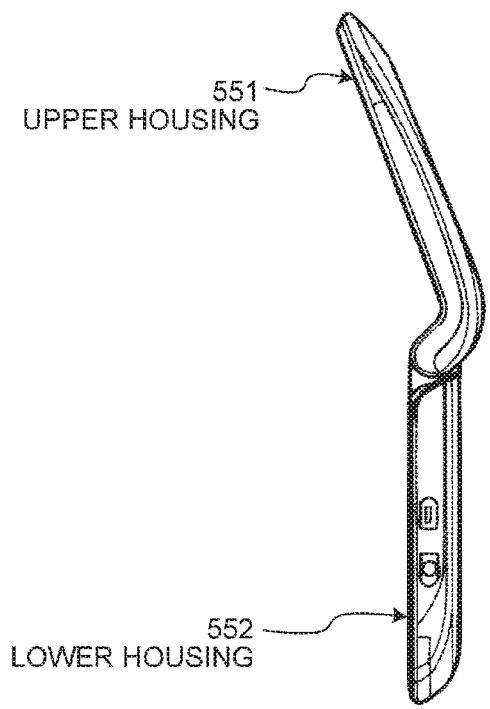
FIG. 25 is a view illustrating one example of the electronic apparatus including the display device according to the embodiment.
Figure 26:
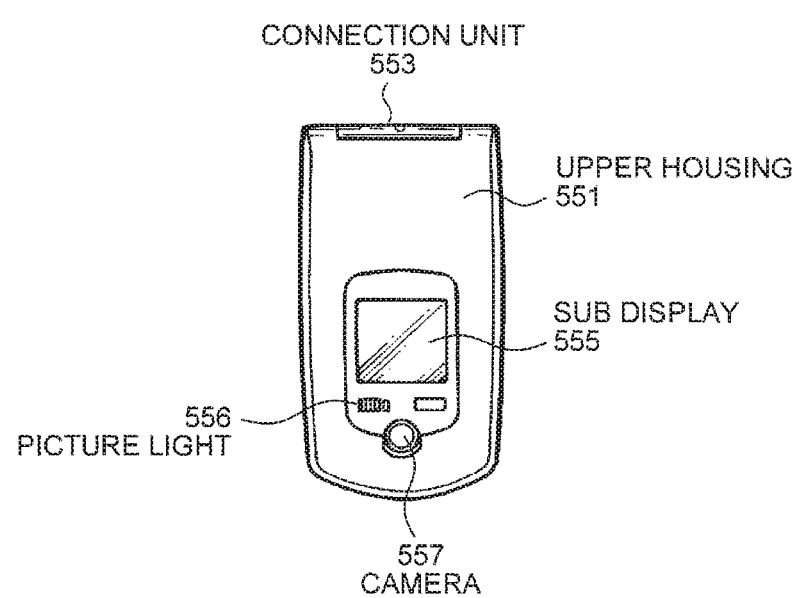
FIG. 26 is a view illustrating one example of the electronic apparatus including the display device according to the embodiment.
Figure 27:
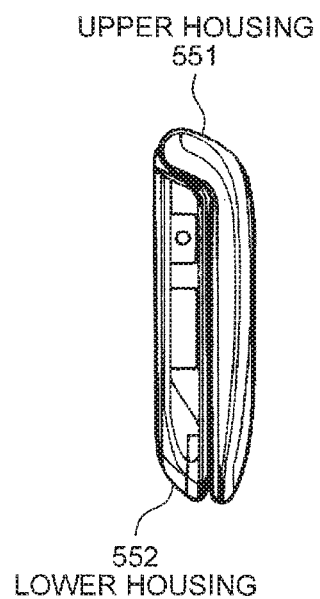
FIG. 27 is a view illustrating one example of the electronic apparatus including the display device according to the embodiment.
Figure 28:
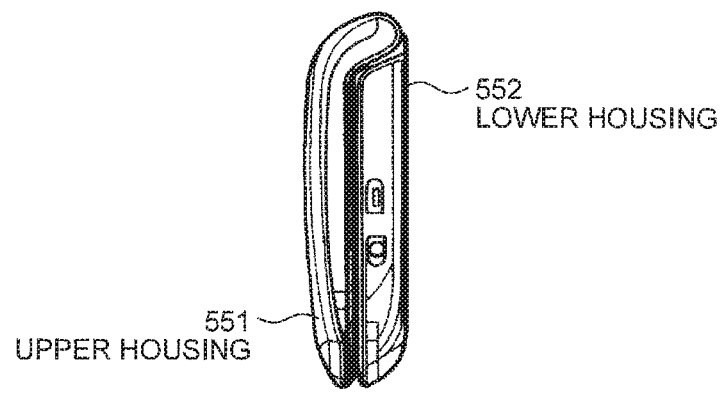
FIG. 28 is a view illustrating one example of the electronic apparatus including the display device according to the embodiment.
Figure 29:
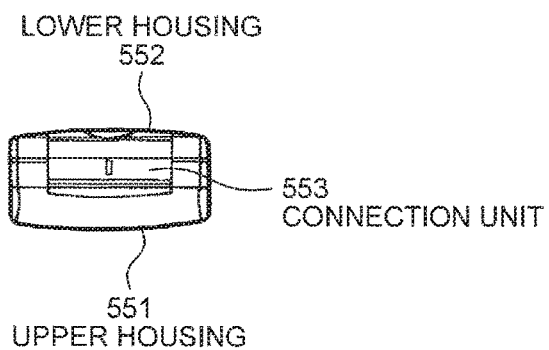
FIG. 29 is a view illustrating one example of the electronic apparatus including the display device according to the embodiment.
Figure 30:
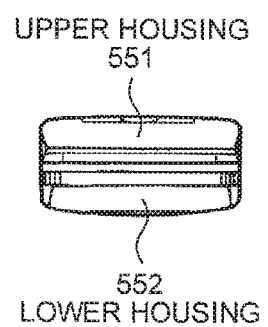
FIG. 30 is a view illustrating one example of the electronic apparatus including the display device according to the embodiment.

The electronic apparatus illustrated in FIG. 24 to FIG. 30 is a mobile phone to which the display device 1 according to the embodiment is applied. FIG. 24 is a front view illustrating a state of the mobile phone that is opened. FIG. 25 is a right side view illustrating a state of the mobile phone that is opened. FIG. 26 is a front view illustrating a state of the mobile phone that is folded. FIG. 27 is a left side view illustrating a state of the mobile phone that is folded. FIG. 28 is a right side view illustrating a state of the mobile phone that is folded. FIG. 29 is a plan view illustrating a state of the mobile phone that is folded. FIG. 30 is a bottom view illustrating a state of the mobile phone that is folded. The mobile phone is, for example, constituted of an upper housing 551 and a lower housing 552 connected to each other with a connection unit (hinge unit) 553, and has a display 554, a sub display 555, a picture light 556, and a camera 557. The display 554 includes the display device 1 mounted thereon. The display 554 of the mobile phone may have a function that detects a touch operation in addition to a function that displays images.

Application Example 6

Figure 31:
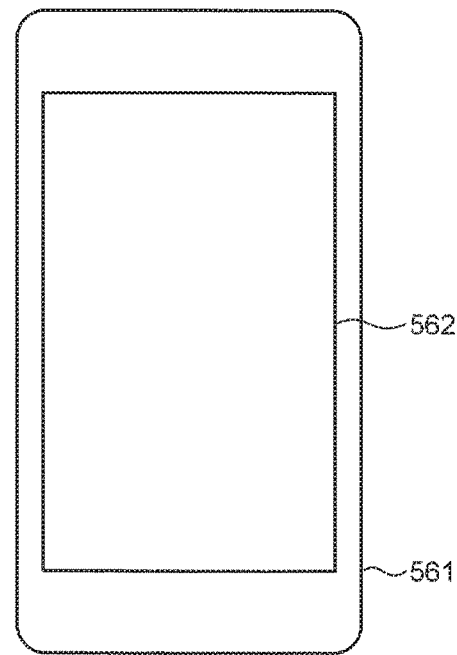
FIG. 31 is a view illustrating one example of an electronic apparatus including a display device according to the embodiment.

The electronic apparatus illustrated in FIG. 31 is operated as a portable computer, a multifunctional mobile phone, portable computer capable of performing a voice call, or portable computer capable of communicating. The electronic apparatus is a handheld terminal that can be referred to as a smart phone or tablet terminal. The handheld terminal includes, for example, a display unit 562 mounted on the face of a casing 561. The display unit 562 is the display device according to the embodiment.

3. ASPECTS OF THE PRESENT DISCLOSURE

The present disclosure includes the following aspects.
(1) A display device comprising:
a display part in which a plurality of pixels including a plurality of sub pixels are arranged in a two-dimensional array and a color filter is stacked such that each of a plurality of filters colored in different colors is arranged at a position corresponding to the respective sub pixels; and
a barrier part in which a plurality of unit areas arranged above the display part, arranged in rows in a first direction, and each extending in a second direction intersecting with the first direction, the barrier part being a liquid crystal panel that changes over transmission and interruption of light incident on the unit areas, wherein
the barrier part includes a barrier substrate that has a plurality of barrier electrodes arranged for each unit area and extending in the second direction, a counter substrate arranged to face the barrier substrate, a liquid crystal layer composed of liquid crystal injected into a space between the barrier substrate and the counter substrate, and a plurality of spacers arranged between the barrier substrate and the counter substrate, and
each of the spacers is arranged between one barrier electrode out of the barrier electrodes and the other barrier electrode adjacent to the one barrier electrode, and overlaps with a filter of a color different from a color of a filter of the color filter that overlaps with a spacer adjacent to the spacer in the second direction.
(2) The display device according to (1), wherein the spacers are arranged such that an arrangement pitch of the spacers in a direction in which the filters of the respective colors of the color filter are arranged in line is different from an arrangement pitch of the filters of colors identical with each other.
(3) The display device according to (1), wherein the spacers are arranged such that one spacer overlaps with a filter of a color different from a color of a filter of the color filter that overlaps with the nearest spacer to the one spacer among spacers adjacent to the one spacer in directions other than the second direction.
(4) The display device according to (1), wherein the spacers are arranged such that a distance between one spacer and the nearest spacer to the one spacer among spacers adjacent to the one spacer in directions other than the second direction is different from a distance equal to an integral multiple of a distance between the one spacer and the other spacer adjacent to the one spacer in a direction in which filters of the respective colors of the color filter are arranged.
(5) The display device according to (1), wherein the spacers are formed in a shape elongated in the second direction.
(6) The display device according to (1), wherein the color filter is formed such that filters of the same colors are arranged adjacent to each other in the first direction.
(7) A display device comprising:
a display part in which a plurality of pixels including a plurality of sub pixels are arranged in a two-dimensional array and a color filter is stacked such that each of a plurality of filters colored in different colors is arranged at a position corresponding to the respective sub pixels; and
a barrier part in which a plurality of unit areas arranged above the display part, arranged in rows in a first direction, and each extending in a second direction intersecting with the first direction, the barrier part being a liquid crystal panel that changes over transmission and interruption of light incident on the unit areas, wherein
the barrier part includes a barrier substrate that has a plurality of barrier electrodes arranged for each unit area and extending in the second direction, a counter substrate arranged to face the barrier substrate, a liquid crystal layer composed of liquid crystal injected into a space between the barrier substrate and the counter substrate, and a plurality of spacers arranged between the barrier substrate and the counter substrate, and
a spacer arranged at least at a position overlapped with any of the barrier electrodes out of the spacers is formed in such a shape that a sectional area along a section parallel to the display surface is gradually increased toward the barrier substrate from the counter substrate.

The display device of the present disclosure can prevent the occurrence of moire while preventing the occurrence of defects in pixels.

What is claimed is:
1. A display device comprising:
a display part in which a plurality of pixels each including a plurality of sub pixels are arranged in a two-dimensional array in a first direction and a second direction, the display part including a plurality of pixel electrodes corresponding to the pixels; and
a barrier part in which a plurality of unit areas each extending in a second direction intersecting the first direction are arranged in the first direction above the display part, the barrier part being a liquid crystal panel that switches between transmission and interruption of light incident on the unit areas, and the barrier part including:
a barrier substrate;
a plurality of barrier electrodes included in the barrier substrate and arranged for each unit area, the barrier electrodes each extending in the second direction,
a counter substrate arranged to face the barrier substrate,
a liquid crystal layer composed of liquid crystal injected into a space between the barrier substrate and the counter substrate, and
a plurality of spacers arranged between the barrier substrate and the counter substrate, each of the spacers having a barrier substrate side and a counter substrate side, wherein
each of the spacers in the barrier part is arranged in such a manner that the barrier substrate side of each of the spacers covers an entire width of a corresponding barrier electrode in the first direction.
2. The display device according to claim 1, wherein each of the spacers has a taper shape such that sectional areas along a section parallel to the barrier substrate gradually increase from the counter substrate side toward the barrier substrate side.
3. The display device according to claim 1, further comprising a controller configured to control the display part and the barrier part, wherein
the barrier part includes a plurality of barrier lines,
each of the barrier lines is coupled to every one of a predetermined number of the barrier electrodes, and
the controller switches a voltage applied to each of the barrier lines to switch between transmission and interruption of light incident on the unit areas.
4. The display device according to claim 3, further comprising an image pick-up unit that determines a position of a viewer, wherein
the controller switches the voltage applied to each of the barrier lines according to the position of the viewer.

5. The display device according to claim 1, wherein the display part further comprises a plurality of signal lines coupled to the corresponding pixel electrodes, and each of the signal lines extends in the second direction.

* * * * *